(12) United States Patent
Kashikar et al.

(10) Patent No.: US 7,585,563 B2
(45) Date of Patent: *Sep. 8, 2009

(54) FIBER SIZE, SIZED REINFORCEMENTS, AND ARTICLES REINFORCED WITH SUCH REINFORCEMENTS

(75) Inventors: Sanjay Kashikar, Kelmis (BE); Jean-Marc Henrion, Theux (BE); Les E. Campbell, Anderson, SC (US)

(73) Assignee: OCV Intellectual Capital, LLC DE (US)

( * ) Notice: Subject to any disclaimer, the term of this patent is extended or adjusted under 35 U.S.C. 154(b) by 165 days.

This patent is subject to a terminal disclaimer.

(21) Appl. No.: 10/982,462

(22) Filed: Nov. 5, 2004

(65) Prior Publication Data

US 2005/0163998 A1 Jul. 28, 2005

Related U.S. Application Data

(63) Continuation-in-part of application No. 09/847,009, filed on May 1, 2001, now Pat. No. 6,846,855.

(51) Int. Cl.
*B32B 17/04* (2006.01)
*B05D 7/24* (2006.01)

(52) U.S. Cl. ............... 428/392; 428/375; 428/391; 427/384; 427/387; 427/389.8; 523/213; 523/214; 524/492; 524/504

(58) Field of Classification Search ............... None
See application file for complete search history.

(56) References Cited

U.S. PATENT DOCUMENTS

| | | | |
|---|---|---|---|
| 3,416,990 A | | 12/1968 | Robinson, Jr. |
| 3,437,550 A | | 4/1969 | Paul, Jr. |
| 3,655,353 A | | 4/1972 | Nalley et al. |
| 3,763,280 A | * | 10/1973 | Gilbert ............... 525/222 |
| 3,810,772 A | * | 5/1974 | Uffner ............... 106/287.2 |
| 3,928,687 A | | 12/1975 | Wada et al. |
| 4,240,944 A | * | 12/1980 | Temple ............... 524/188 |
| 4,243,481 A | * | 1/1981 | Dumas ............... 162/158 |
| 4,283,322 A | * | 8/1981 | Temple ............... 524/522 |
| 4,394,418 A | | 7/1983 | Temple |
| 4,426,469 A | | 1/1984 | Marzola et al. |
| 4,483,948 A | | 11/1984 | Tamosauskas |
| 5,130,197 A | | 7/1992 | Temple |
| 5,176,956 A | | 1/1993 | Jevne et al. |
| 5,221,285 A | | 6/1993 | Andrews et al. |
| 5,242,969 A | | 9/1993 | Arpin et al. |
| 5,300,547 A | | 4/1994 | Hagenson et al. |
| 5,376,701 A | | 12/1994 | Chow et al. |
| 5,447,689 A | * | 9/1995 | Gibboni et al. ............... 422/56 |
| 5,470,658 A | | 11/1995 | Gasca et al. |
| 5,643,989 A | | 7/1997 | VanDeGrampel et al. |
| 5,646,207 A | * | 7/1997 | Schell ............... 524/47 |
| 5,661,213 A | | 8/1997 | Arkens et al. |
| 5,670,255 A | * | 9/1997 | Temple et al. ............... 428/392 |
| 5,789,329 A | | 8/1998 | Eastes et al. |
| 5,883,023 A | | 3/1999 | Martine et al. |
| 5,900,454 A | * | 5/1999 | Kirchmeyer et al. ............... 524/522 |
| 5,932,689 A | | 8/1999 | Arkens et al. |
| 5,955,547 A | | 9/1999 | Roberts et al. |
| 5,977,232 A | | 11/1999 | Arkens et al. |
| 6,106,982 A | | 8/2000 | Mientus et al. |
| 6,139,955 A | | 10/2000 | Girgis |
| 6,207,737 B1 | | 3/2001 | Schell et al. |
| 6,211,280 B1 | | 4/2001 | Schell |
| 6,419,981 B1 | * | 7/2002 | Novich et al. ............... 427/180 |
| 6,451,919 B1 | | 9/2002 | Aglietto et al. |
| 6,551,707 B1 | | 4/2003 | Adzima et al. |
| 6,833,182 B2 | * | 12/2004 | Audenaert et al. ............... 428/297.4 |
| 6,926,767 B2 | * | 8/2005 | Chen ............... 106/243 |
| 2001/0016259 A1 | | 8/2001 | Campbell et al. |
| 2002/0123285 A1 | * | 9/2002 | Dana et al. ............... 442/237 |
| 2002/0193027 A1 | * | 12/2002 | Dana et al. ............... 442/285 |
| 2002/0198301 A1 | | 12/2002 | Campbell et al. |
| 2004/0002569 A1 | | 1/2004 | Kitano et al. |
| 2004/0229985 A1 | | 11/2004 | Kashikar |
| 2005/0163998 A1 | | 7/2005 | Kashikar et al. |
| 2005/0279140 A1 | * | 12/2005 | Adzima et al. ............... 65/453 |
| 2006/0036003 A1 | * | 2/2006 | Adzima et al. ............... 523/421 |
| 2006/0083922 A1 | | 4/2006 | Kashikar et al. |

FOREIGN PATENT DOCUMENTS

| | | |
|---|---|---|
| EP | 0 278 409 | 8/1988 |
| EP | 0 404 303 | 12/1990 |
| EP | 0 430 109 | 6/1991 |
| EP | 1 460 166 | 9/2004 |
| JP | 10-291841 | 4/1998 |
| JP | 10-324544 | 8/1998 |
| WO | WO 02/088044 | 11/2002 |
| WO | WO 00/48957 | 8/2003 |
| WO | WO 2004/031246 | 4/2004 |

\* cited by examiner

*Primary Examiner*—Jill Gray
(74) *Attorney, Agent, or Firm*—James J. Dottavio; Kathryn W. Grant

(57) ABSTRACT

A fiber-size composition contains a modified polyolefin, a hydrophilic coupling agent, and an enhancer with at least one of the following: a fluorine-containing compound, a hydrophobic coupling agent, a cyclic fatty acid, or at least two saturated fatty acids with at least one of said fatty acids having at least two acid groups. When reinforcing fiber materials sized with the composition are used to form composite articles, the articles show improved properties such as strength and color.

57 Claims, No Drawings

FIBER SIZE, SIZED REINFORCEMENTS, AND ARTICLES REINFORCED WITH SUCH REINFORCEMENTS

CROSS REFERENCE TO RELATED APPLICATION

This application is a Continuation-in-Part of U.S. application Ser. No. 09/847,009 filed May 01, 2001, now U.S. Pat. No. 6,846,855, all of which is incorporated by reference as if completely written herein.

TECHNICAL FIELD AND INDUSTRIAL APPLICABILITY OF THE INVENTION

The present invention relates to fiber-size compositions for coating glass or other reinforcing fiber materials that are used in the manufacturing of composites that have desirable properties such as high strength and high resistance to chemical degradation including hydrolysis and detergent degradation. The fiber-size composition of the present invention also yields composites of more neutral or natural coloring, and minimizes or eliminates discolorations associated with conventional fiber-size compositions without requiring the use of an optical brightener. The fiber-size composition of the present invention may also be used to coat reinforcing fibers for use in composites that may subsequently be pigmented to obtain a desired color. In this regard, the composition advantageously provides better color matching during the pigmentation process without the need for color compensating additives. The fiber-size compositions of the present invention are particularly useful for coating glass fibers such as E-glass fibers including low boron and/or low fluorine or essentially boron-free and/or fluorine-free glasses used in the manufacture of glass-reinforced composites. One of the purposes of the fiber-size composition is to improve the strength and resistance of composites reinforced with fibers coated with size composition to chemical degradation including hydrolysis and detergent degradation while providing good color properties without the use of optical brighteners and/or color compensating additives. More especially, the present invention relates to fiber-size compositions comprising at least one of the following strength and/or color improving enhancers: 1) saturated fatty acids, 2) fluorine additives, 3) hydrophobic coupling agents, and 4) cyclic saturated fatty acids.

BACKGROUND OF THE INVENTION

The reinforced composite industry has historically used reinforcing fibers, such as glass, in the form of continuous or chopped fibers, strands, and rovings to reinforce polymer matrices. These are used to make a wide range of composite products that possess a high degree of resilience and load-bearing ability. Such composite products may also be manufactured to possess decorative characteristics such as patterns, surface embossing, and coloration.

Glass reinforced polyolefin composites can be found in automotive, electrical and household appliance industries. Their use often requires combinations of specific mechanical, physical, chemical, and aesthetic properties. In many reinforced polyolefin composite applications, high strength, high resistance to chemical degradation and improved coloring are highly desirable properties. It is also highly desirable to produce polyolefin composites with mechanical properties such as low tensile creep and high resistance to fatigue. These parameters are considered when predicting the composite parts useful life span, and also when designing the composite part, often affecting its final thickness and weight.

The sizing composition plays a key role in determining the properties of the reinforced composite part. During manufacturing of the composite part, the fiber-size composition forms an interphase between the reinforcing fiber and the polymer matrix. When a load is applied to the composite part, force is transferred from the matrix to the fibers. A strong interphase is desired for high composite strength. High composite strength can be achieved with good adhesion of the fiber surface to the interphase, as well as from good adhesion between the interphase and the polymer matrix.

Good adhesion between the interphase and polymer matrix is generally achieved by the use of an appropriate fiber-size composition applied to the fibers. Although it may be relatively easy to tailor and improve a single specific property of the composite, it is difficult to improve several properties at the same time. For example, a sizing composition may be used to form a composite part with good initial strength. However, this composition may not form a composite with other properties such as good hydrolysis and detergent resistance, or good resistance to discoloration.

Therefore, it is desirable that the fiber-size composition form an interphase that is strong, resistant to thermal degradation, resistant to chemical degradation, provides good adhesion between the fiber and fiber-size composition, and provides good adhesion between the fiber-size composition and the polymer matrix. Also, the fiber-size composition must be compatible with both the reinforcing fibers, which may be inorganic, and the polymer matrix, which may be organic. Sodium, potassium, and calcium tetraborates and sodium borohydride are reported in Japanese Kokai 10[1998]291841 and 10[1998] 324544, respectively, as improving the performance of epoxy and urethane sizing, it being noted that epoxy resins have a poor adhesion to the reinforcing fiber while polyurethane, although having good adhesion to the reinforcing fiber, adheres poorly to the matrix resin.

In order to achieve composites with improved color, it is necessary to have a fiber-size composition comprising thermally stable ingredients that provide high resistance to oxidation and yellowing. As used here, the term "size" or "sizing" refers to a coating that is applied initially to forming filaments of a fiber for the purpose of protecting the fiber from abrasion breakage of the fibers during further processing of the fibers and subsequently promoting the adhesion between the fibers and the materials which they reinforce. While some physical binding between filaments may occur when the filaments are bundled into threads, it is essential that the sizing not interfere with the dispersion of the fibers in the matrix into which the fibers are incorporated. That is, the sizing should not have a tendency to agglomerate the threads, especially when incorporated into a matrix composition. This is in contrast to a "binder" where the formulation promotes the binding of threads to each other at their intersection (crossing points) in such forms as mats, fabrics and nonwovens through the polymerization of the binder while it is in contact with the fibers.

In binder applications, the major emphasis is on binding the threads together at their intersection in order to provide mat strength and stability. Unlike a size where application during filament formation is the norm and the size may be the only composition applied to the fiber prior to its final use, binders are typically used in addition to separate size compositions and are applied much later in the manufacturing process after the size has been applied. One of the purposes of a size is to coat the entire filament in order to protect the filaments and fibers during initial formation of the filaments and fibers and in their subsequent processing.

Binders are applied in a separate process after the filaments and fibers have been sized and processed to their final form and are used to bind and to hold firmly individual fibers to each other at their intersection or crossing points with each other. In a size, the emphasis is on bond formation between moieties already existing on components in the size composition and moieties found on the glass and between moieties found on components in the size composition and moieties found in the matrix resin typically with minimal polymerization of the components found in the size composition. A size typically solidifies on the fiber principally as a result of physical water removal whereas a binder is designed for a chemical (typically polymerization) reaction that gives a stronger fiber to fiber binding.

Traditionally, sizing compositions used in polypropylene composites are characterized by an aqueous emulsion of a film former having a highly modified polypropylene resin of low molecular weight. For example, ChemCorp 43N40, an aqueous emulsion of a maleic anhydride grafted polypropylene resin (E43 from Eastman Chemical Company) may be used as the main film forming agent in a sizing composition. E43 has an average molecular weight of 9000, and represents a resin with relatively low molecular weight. Although a sizing composition based on this film former is compatible with the reinforcing fibers and the polypropylene matrix resin, the final interphase formed is not strong due to the lower mechanical strength of this film former. Composite parts made from this sizing composition may possess insufficient short-term and long-term mechanical properties.

Additionally, in many similar sizing compositions, the surfactant package used in the film former emulsion contains low molecular weight chemicals which may be unsaturated, have one or more amine groups, or have amino groups which may be characterized as cationic in nature. These chemicals contribute to poor composite properties such as the discoloration of the composite part. Examples of these chemicals are unsaturated fatty acids (such as oleic, linoleic, and linolenic acids) and amine based neutralizing agents (such as triethylamine and nitrogen containing cationic surfactants). These agents can further cause yellowing and discoloration of the composite. Such properties make the final composite part unsuitable for many applications, and limit their use. Therefore, there is a need for a fiber-size composition that overcomes these problems.

Discoloration in molded composite products, or in the materials used to manufacture molded composite products, may arise from the presence of contaminants in one or more materials that make up the composite formulation, or from the presence of impurities in the ingredients that are used to form fiber-reinforced composites. These ingredients may be materials used in fiber-size compositions for coating reinforcing fibers before they are molded into composites. For example, conventional sizing compositions often impart a yellow color or other discoloration to fiber reinforcements after such sizings are applied. These discolorations are then carried over into the composite product when the reinforcements are molded. These discolorations may be caused by oxidative decomposition of unsaturated chemicals, such as fatty unsaturated surfactants and/or lubricants, which are of low thermal stability. These discolorations may also be caused by nitrogen containing compounds, such as amides, imides, cationic surfactants or amine-based chemicals, which are used, for example, as neutralizing agents.

Historically, the problem of discoloration has been partially addressed by adding ingredients to the composite formulation to counteract the discoloration before the composite formulation is molded. Frequently, antioxidants are used in the compounding formulations to minimize thermal degradation and associated discoloration. Also, the added ingredient may be a colorant, e.g., pigment or dye, that changes the color of the composite formulation. For example a blue pigment or dye may be added to the composite formulation to combat a yellow discoloration and, as a result, the finished molded composite appears whiter.

A more recently developed method of correcting discoloration has been adapted to fiber-reinforced composite manufacturing. Although, it has traditionally been used in compositions applied to paper products, clothing, and plastics to create a brilliant white appearance, this method involves adding an optical brightener, such as a fluorescent whitening or brightening agent, to the composite formulation or to the sizing compositions that are applied to the fiber reinforcements used to mold composites. U.S. Pat. No. 5,646,207, for example, describes a sizing composition that includes a fluorescent whitening agent in addition to other sizing ingredients such as a carboxylated polypropylene, a silane coupling agent, and a lubricant. However, compositions such as those disclosed in this patent rely specifically on the presence of the fluorescent whitening agent to reduce discoloration in the composite product. A related patent, U.S. Pat. No. 6,207,737 discloses the use of various stabilizers such as phosphinates, phosphonites, phosphties, hypophosphites, sulfites and bisulfites that are reported as effective in deterring oxidation of the matrix polymer in which the material is used. Preferably such stabilizers are used with a fluorescent whitening agent.

Use of an optical brightener does not, however, satisfactorily solve the problem of discoloration in the molded composite. According to U.S. Pat. No. 5,646,207, discoloration problems in the molded composite remain when the fluorescent whitening agent is added to the composite formulation because, in order to prevent discoloration satisfactorily, the fluorescent whitening agent must be well dispersed into the matrix polymer of the composite formulation. At the same time, the patent notes that uniform dispersion of the fluorescent brightener in the matrix polymer is difficult to achieve.

Other technical and economic problems stem from the use of optical brighteners such as a fluorescent whitening agent in composite formulations and in particular, in sizing compositions for fiber reinforcements. Technical problems may compromise the quality of the composite product, including degradation of the composite matrix polymer or undesirable interactions with other composite ingredients. For example, an optical brightener typically accelerates degradation of the matrix polymer when it is exposed to ultraviolet (UV) light or other forms of radiant energy. Moreover, optical brighteners themselves can degrade chemically over time, and thus contribute to yellowing or other discoloration of molded composite articles. Another observed problem arises when an optical brightener reacts with other ingredients such as an antioxidant that may be added to the composite formulation. In this regard, combining the optical brightener and the antioxidant reduces the efficiency of both ingredients, and ultimately results in discoloration of the composite.

Additionally, it has been observed that color matching of composite batches is difficult to achieve when the composite contains optical brighteners. In order to compensate for these difficulties in color matching, varying amounts of pigments or other additives have been added to the composite, which makes it difficult to maintain consistent color between batches. The difficulties encountered in turning out composite batches having consistent color, in turn, increase the cost of production by requiring more starting materials and higher labor costs, and therefore poses an economic disadvantage in addition to the technical problems. Further, color analysis of molded articles that contain optical brighteners is difficult because the articles behave differently under different lighting types and conditions. These problems with color analysis also increase the costs of producing the fiber reinforcements and/or the composite product. The use of optical brighteners further contributes to increased production costs simply because they are expensive chemicals.

In some applications, such as the manufacturing of washing machine parts, it may be desired that the molded composite product have a white color. In this regard, whitening pigments have been added directly to the composite molding composition to provide the white coloration. One such typically used whitening pigment is powdered titanium dioxide ($TiO_2$). However, the addition of whitening pigments such as $TiO_2$ results in damage to the reinforcing glass fibers and dramatically reduces the mechanical strength of the composite.

EP0826710 B1 and EP0826710 B1 disclose the use of a combination of tetrafluroborates and/or hypophosphinates as an accelerator in the curing of polyacids and bases to form a polymeric composition that is useful as a binder for binding nonwoven materials at the intersection or cross-over points of their individual fibers. Although useful in promoting the binder cross-linking reaction between polyacids with at least two carboxylic acid groups and hydroxyl or amine compounds, its use for a non-polymerization function such as found in sizing compositions is not mentioned or suggested. In U.S. Pat. No. 5,221,285, alkali metal dihydrogenphosphate, and alkali metal salts of phosphorous, hypophosphorous and polyphosphoric acids are used as catalysis in the esterfication and crosslinking of cellulose in textile form to polycarboxylic acids to form wrinkle resistant fabrics. Sodium borate and tetraborate, boric acid, and sodium borohydride are used to remove discoloration produced when cellulosic material is crosslinked with an alpha-hydroxy acid. Neither use is suggestive of use in a size composition.

Therefore, it is an object of the present invention to provide cost-effective fiber-size compositions.

It is an object of the present invention to provide increased whiteness to composite articles made with fibers sized with the fiber-size composition of the present invention.

It is an object of the present invention to provide increased brightness to composite articles made with fibers sized with the fiber-size composition of the present invention.

It is an object of the present invention to provide increased color compatibility to composite articles made with fibers sized with the fiber-size composition of the present invention.

It is an object of the present invention to provide increased whiteness, brightness, and/or color compatibility to composite articles made with fibers sized with the fiber-size composition of the present invention without requiring the use of an optical brightener.

It is an object of the present invention to provide increased whiteness, brightness, and/or color compatibility to composite articles made with fibers sized with the fiber-size composition of the present invention while maintaining desirable strength properties of the molded composite article.

It is yet another object of the present invention to provide composite articles made with fibers sized with the fiber-size composition of the present invention that are stable to oxidation degradation.

It is an object of the present invention to provide composite articles made with fibers sized with the fiber-size composition of the present invention that resist discoloration.

It is an object of the present invention to provide composite articles made with fibers sized with the fiber-size composition of the present invention that resist thermal degradation.

It is an object of the present invention to provide composite articles made with fibers sized with the fiber-size composition of the present invention that create a stronger interphase between the fiber and matrix resin.

It is an object of the present invention to provide composite articles made with fibers sized with the fiber-size composition of the present invention that have desirable short-term mechanical properties.

It is an object of the present invention to provide composite articles made with fibers sized with the fiber-size composition of the present invention that have desirable long-term mechanical properties.

It is another object of the present invention to provide composite articles made with fibers sized with the fiber-size composition of the present invention that have increased resistance to chemical breakdown.

It is an object of the present invention to provide composite articles made with fibers sized with the fiber-size composition of the present invention that have increased resistance to thermal deterioration.

The foregoing and other objects, features and advantages of the invention will become apparent from the following disclosure in which one or more preferred embodiments of the invention are described in detail. It is contemplated that variations in procedures may appear to a person skilled in the art without departing from the scope of or sacrificing any of the advantages of the invention.

SUMMARY OF THE INVENTION

The above problems are solved and objects met by the present invention which features a fiber-size composition comprising a) a modified polyolefin, b) a hydrophilic coupling agent, and c) an enhancer having at least one of the following: 1) a fluorine-containing compound, 2) a hydrophobic coupling agent, 3) a cyclic fatty acid or 4) at least two saturated fatty acids where at least one of the fatty acids has two or more acid groups.

The fiber-size composition is typically aqueous based, such as in the form of an aqueous emulsion. To achieve a fiber-size composition having modified polymers such as maleic anhydride modified polypropylene with high molecular polymer weights, e.g., greater than 10,000; 35,000; 80,000 or even 100,000, the modified polyolefin can be formed as a nonionic aqueous polymer emulsion from a single, pressurized, heated and stirred mixture of the modified polyolefin, a fatty acid, a nonionic surfactant, a base, and water.

The hydrophilic coupling agent has at least one group that is reactive with a fiber and a second group that is reactive with the modified polyolefin. Both of these groups tend to be hydrophilic and usually soluble in water. Typically the hydrophilic coupling agent is a silane.

An antioxidant can be used in the fiber-size composition. Typically the antioxidant is a phosphorous-containing compound and preferably a phosphorous-containing compound in a lower phosphorous oxidation state. Such compounds include the hypophosphite compounds such as the alkali metal hypophosphites, alkaline-earth hypophosphites, ammonium hypophosphite, and mixtures thereof. Sodium hypophosphite has been found to be an effective phorphorous-containing compound.

When the enhancer is a fluorine-containing compound it is selected from fluorine-containing compounds such as the fluoroborates, alkali-metal fluorides, alkaline-earth fluorides, fluoroaluminates, fluorozirconates, and mixtures of these compounds. Sodium or potassium tetrafluoroborate are suitable compounds for the fiber-size composition. These fluorine compounds have been found to improve the strength and color characteristics of various composites formed from fibers coated with the fiber size of the current invention.

When the enhancer is a hydrophobic coupling agent, one or more of the groups is a hydrophobic group such as an alkyl group. Typically the hydrophobic coupling group is a silane with one or more of these alkyl groups while the remaining groups on the silane are capable of binding with the fiber. The hydrophobic groups are believed to protect the fiber-resin interface from moisture and water attack in the final composite article.

The enhancer can be selected as a cyclic fatty acid. The cyclic fatty acid is the product of the dimerization of two fatty acids to produce a cyclohexene with two pendant alkyl groups and two pendant acid groups which has been hydrogenated to remove all unsaturated bonds in the dimmer product. As with the hydrophobic coupling agent, the pendent acid groups can react with the various active groups on the fiber or modified polymer while the hydrophobic alkyl groups protect the interface from attack by moisture, water, and other polar reactants.

Finally the enhancer can be chosen to be at least two saturated fatty acids where at least one of the saturated fatty acids has at least two acids groups. The two saturated fatty acids are used without color compensating additives in the fiber-size composition and the other components in the fiber-size composition are selected to be essentially fully saturated and contain substantially no discoloring nitrogen compounds. As used here, the term "fatty acid" includes the lower alkyl acids. Preferably the fatty acids contain from about three to about forty carbon atoms. The monoacid fatty acid preferably contains from about eight to about thirty-six carbon atoms. Unlimiting examples of monoacids are myristic acid, palmitic acid, pentadecanoic acid, margaric acid, stearic acid, behenic and montanic acid. Unlimiting examples of fatty acids containing two or more acids groups include such acids as oxalic, melonic, succinic, adipic, citric and sebacic acid. A mixture of palmitic acid, sebacic acid, and stearic acid is suitable for the fiber-size composition. Because the fatty acids have been found to serve a multitude of functions such as lubricant, surfactant, solvent, the fiber-size composition can be formed with a minimum of components. Thus a good composition can consist of only a nonionic aqueous polymer emulsion from a single, pressurized, heated and stirred mixture of the modified polyolefin, a polymer emulsion fatty acid, a nonionic surfactant, a base, and water, at least two fatty acids of which one contains at least two acid groups, a hydrophilic coupling agent and an antifoam agent.

When other enhancers are selected that have a hydrophobic character, it may be necessary to add additional ingredients to aid in forming a good fiber-size composition emulsion. Such agents include wetting agents, lubricants, surfactants, and antifoam agents. However, ionic agents with nitrogen functionality, non-ionic agents, especially those based on alkylphenols and agents with unsaturated functionality should be avoided for color control reasons as well as safety and environmental considerations. If unsaturated agents are used, the Iodine Value of the components of the fiber-size composition other than the modified polyolefin should each have a value of less than about 0.35.

Generally a boron-containing compound can be used with the fiber-size composition. Typical boron-containing compounds that may be used are borohydrides, perborates, borosilicates, boron nitride, organoboron compounds, borazoles, boron halides, tetraborates, boric acid and mixtures thereof. Sodium tetraborate, i.e., $Na_2B_4O_7$, is a convenient compound for use in the fiber-size composition. The fiber-size composition can also contain an antioxidant such as a phosphorous-containing compound with phosphorous in a plus three oxidation state such as is found in hypophosphite compounds. Polyurethane can also be used in the fiber-size composition along with the modified polyolefin and has been found to improve the processing characteristics of the size composition and is also useful in maintaining fiber integrity during the processing of coated fibers.

Glass fibers are typically coated with the fiber-size composition as part of the fiber filament formation process. By coating the fiber with the size composition early in its formation stage, the fiber size coating protects the filaments from abrasion and breakage as the filaments are formed into fibers and wound or chopped for further process.

The fiber-size composition can be applied to all glass fibers including E-glass (a borosilicate glass) as well as boron-free fibers. The boron-free fibers can also be essentially free of moieties such as $F_2$, $TiO_2$, $SO_3$, and combinations of them. A boron-free glass fiber that can be advantageously coated with the fiber-size composition of the present invention consists essentially of 59.0 to 62.0 weight percent $SiO_2$, 20.0 to 24.0 weight percent CaO, 12.0 to 15.0 weight percent $Al_2O_3$, 1.0 to 4.0 weight percent MgO, 0.0 to 0.5 weight percent $F_2$, 0.1 to 2.0 weight percent $Na_2O$, 0.0 to 0.9 weight percent $TiO_2$, 0.0 to 0.5 weight percent $Fe_2O_3$, 0.0 to 2.0 weight percent $K_2O$, and 0.0 to 0.5 weight percent $SO_3$. More specifically the coated fiber is a boron-free glass fiber in which the $SiO_2$ content is about 60.1 weight percent, the CaO content is about 22.1 weight percent, the $Al_2O_3$ content is about 13.2 weight percent, the MgO content is about 3.0 weight percent, the $K_2O$ content is about 0.2 weight percent, the $Na_2O$ content is about 0.6 weight percent, the $Fe_2O_3$ content is about 0.2 weight percent, the combined content of $SO_3$ and $F_2$ content is about 0.1 weight percent, and the $TiO_2$ content is about 0.5 weight percent.

After the fiber is coated with the fiber-size composition, it is used as part of a compounding formulation that includes the size coated (reinforcing) fiber and a matrix resin. The matrix resin can be selected from a wide variety of plastics including polyolefins, polyesters, polyacetals, polyamides, polyacrylamides, polyimides, polyethers, polyvinylethers, polystyrenes, polyoxides, polycarbonates, polysiloxanes, polysulfones, polyanhydrides, polyimines, epoxies, polyacrylics, polyvinylesters, polyurethane, maleic resins, urea resins, melamine resins, phenol resins, furan resins, polymer blends, polymer alloys and mixtures of them. The compounding formulation can also contain one or more compounding agents such as coupling agents, antioxidants, pigments, antistats, fillers, flame retardants and other additives. Preferably the matrix resin is a polyolefin such as polypropylene.

The compounding formulation is then typically processed to form pellets that are then injected molded to form the desired composite article.

The present invention also features a method of preparing reinforcing fibers and then using them to form a composite article. The method of preparing the reinforcing fibers comprises the steps of preparing a fiber-size composition of a modified polyolefin, a hydrophilic coupling agent, and an enhancer comprising at least one of the following: (a) a fluorine-containing compound, (b) a hydrophobic coupling agent, (c) a cyclic fatty acid, (d) at least two saturated fatty acids of which one is a fatty acid with at least two acid groups, and (e) as mixtures of (a) through (d). The two or more fatty acids can be used without color compensating additives in the fiber-size composition. The other components of the fiber-size composition should be essentially fully saturated and the fiber-size composition should be free from discoloring nitrogen compounds. After the fiber-size composition is prepared, it is contacted with fibers after which the fiber-size composition is allowed to solidify on the fibers to form the reinforcing fibers. In the present method, the modified polyolefin can be prepared as a nonionic aqueous polyolefin emulsion by heating and stirring a single mixture of the modified polyolefin, a fatty acid, a nonionic surfactant, a base, and water in a pressurized container and then mixing the resulting aqueous emulsion with the other components of the fiber-size composition.

After the reinforcing fibers are prepared they are mixed with a matrix resin to form a composite formulation. The composite formulation can also contain coupling agents, antioxidants, pigments, antistats, fillers, and flame retardants. The composite formulation is then processed to form a composite article.

The foregoing and other objects, features and advantages of the invention will become apparent from the following disclosure in which one or more preferred embodiments of the invention are described in detail and illustrated in the accompanying examples. It is contemplated that variations in procedures, selection of component compounds, and their manner of interaction may appear to a person skilled in the art without departing from the scope of or sacrificing any of the advantages of the invention.

DETAILED DESCRIPTION AND PREFERRED EMBODIMENTS OF THE INVENTION

The present invention comprises a fiber-size composition having an enhancer that improves the sizing reinforced fiber materials used in the manufacture of fiber-reinforced composites. The fiber-size composition provides improved short-term mechanical performance of fiber-reinforced composites such as increased strength. The fiber-size composition also provides improved long-term mechanical performance of the composite such as increased resistance to creep and fatigue. The fiber-size composition provides a composite with higher resistance to thermal and chemical breakdown including breakdown due to hydrolysis.

Properties such as whiteness, neutral coloring and ease of color matching of the fiber reinforced composite are afforded in addition to good short-term and long-term mechanical performance and good resistance to thermal and chemical breakdown. Although not completely understood, it is believed that the discoloration associated with the thermal oxidation or thermal degradation of the fiber-size composition also relates to degradation at the inter-phase. This causes poor adhesion between the fiber and polymer matrix leading to decreased overall mechanical performance of the composite. The present invention provides improved performance of the reinforced composite by selecting components of the fiber-size composition that resist thermal oxidation and/or thermal degradation.

The present invention comprises a substantially non-discoloring fiber-size composition. The terms "substantially non-discoloring" or "having minimal discoloration", as used herein, are intended to mean that the fiber-size composition tends not to cause discoloration of either the reinforcing fiber material treated with the size composition or the composite formed there from. The fiber-size composition causes only de minimis coloration such that the whiteness or neutral color in the reinforcing fiber material or the resulting molded composite is optimized. The terms are also intended to mean that the reinforcing fiber material or molded composite product may be color matched with other batches of similar materials without the technical and economic difficulties typically associated with variations in color caused by the inclusion of an optical brightener.

While the reason for the substantially non-discoloring effect of the fiber-size composition of the present invention has not been definitively established, it is believed that it may be due, in part, to the fact that the selected fiber-size composition components provide better resistance to thermal or oxidative degradation. The components are preferably based mainly on molecular species having no or very few reactive double bonds, that is, preferably, they are highly saturated. The term "highly saturated", as used herein with respect to a particular fiber-size composition component other than the modified polyolefin, is intended to mean that the proportion of unsaturated organic bonds is less than up to a maximum of 0.35 as quantified by the ingredient's Iodine Value and preferably as close to zero as possible. This means that the components are selected to be as free as possible of highly unsaturated molecular species, such as may be found in unsaturated surfactants, lubricants, wetting agents, antifoaming agents, emulsifiers, coupling agents, and other compounds found in the fiber-size composition.

It is believed that unsaturation as characterized by double bonds in unsaturated compounds causes them to be more reactive to chemical degradation mechanisms such as oxidation. As a result, the compounds are more prone to develop discoloring reaction products in the sizing formulation or in the composite formulation. The fiber-size composition of the present invention is based on highly saturated chemicals having no or few double bonds that are oxidatively and thermally more stable than the unsaturated compounds conventionally used to form fiber-size compositions. The non-discoloring effect is also believed to be partly attributable to the preferred absence of certain types of nitrogen-containing compounds such as some amines, imides, and amides including fatty amines, fatty amides, and nitrogen-containing cationic surfactants, lubricants, wetting agents and other additives that cause discoloration. However, nitrogen-containing compounds that tend not to discolor may be used while maintaining the non-discoloring property of the composite.

The fiber-size composition of the present invention includes one or more film forming polymers selected from the group of grafted or chemically modified polyolefins. The term "grafted polyolefin", "functionalized polyolefin", "chemically modified polyolefin" or simply "modified polyolefin, as used herein, is intended to mean a polymeric olefin that has been chemically modified and functionalized to incorporate one or more reactive functional groups on the main polyolefin polymer chain. Typically, the modified polyolefin is based on olefin monomers having two to about six atoms. Non-limiting examples of polymers based on these monomers include polyethylene, polypropylene, polybutene, polyisobutylene, and polyhexene. Preferred polymers include the homo- and co-polymers of polypropylene that are crystalline, semi-crystalline, amorphous, or rubbery and elastomeric and mixtures thereof.

Reactive functional groups are groups that are capable of undergoing further chemical reactions with other chemical species. Some examples of such reactive functional groups are acid anhydride, carboxylic acid, hydroxyl, amino, amide, ester, isocyanate, double bonds, and epoxy groups. Although many types of reactive functional groups can be attached to the polyolefin chains, as noted above, it is desirable to avoid unreactive and unreacted nitrogen-containing and unsaturated functional groups. As such, acid anhydride, carboxylic acid, hydroxyl, and epoxy groups are preferred. More preferred are the following examples of reactive groups that include, but are not limited to, acids or anhydrides such as maleic acid, acrylic acid, methacrylic acid, maleic anhydride, acrylic anhydride, methacrylic anhydride, and oxiranes such as glycidyl acrylates or methacrylates with the most preferred groups being acid anhydride groups. Modified polyolefins including modified polypropylene are commercially available as emulsions. Preferred emulsions are based on nonionic surfactants, lubricants, wetting agents, emulsifiers, and other ingredients that tend to avoid discoloring. Generally, the level of grafted functional groups is in the range of 0.05% to 15% by weight based on the total weight of the polymer. Typically, the amount of the grafted polyolefin in the fiber-size composition ranges from about 20% by weight to about 90% by weight, based on the total dry solids content of the fiber-size composition. Preferably, the amount of grafted polyolefin used is from about 30% by weight to about 80% by weight of the total dry solids. Most preferably, the amount is between about 35% to about 70% by weight of the total dry solids content of the aqueous fiber-size composition.

Preferably high molecular weight modified polypropylenes with molecular weights greater than about 10,000 are preferred for use in the fiber-size composition as these improve considerably the strength properties of the resulting fiber reinforced composite. Unfortunately in the past, it has been difficult to provide high molecular weight polypropylenes in a form suitable for fiber application during fiber manufacture. Various techniques for emulsifying these polymers can involve hydrocarbons solvents, multiple steps, and grinding and blending at high shear and high temperature that result in excessive degradation and deterioration of the polypropylene structure that leads to less than desirable mechanical properties and color performance in the resulting fiber reinforced composites.

As set forth in U.S. application Ser. No. 10/334,468 filed Dec. 31, 2002, all of which is incorporated here as if completely re-written herein, a method has been found for the aqueous emulsification of high molecular weight polyolefins that avoids these problems. Further the method allows for the emulsification of polypropylene polymers with a molecular weight greater than about 80,000 and even greater than about 100,000. In a one step method, the functionalized polyolefin, a fatty acid, a surfactant, and water are heated and stirred in a pressurized vessel to afford the high, molecular weight, modified polyolefin emulsion.

All components of the modified polyolefin emulsion are selected to promote a high strength composite with minimal discoloration. High molecular weight polypropylene is preferred with molecular weights above 10,000; 35,000; 80,000; and even above 100,000 being used. Functional groups such as maleic anhydride or acid is attached to the polymer rather than yellowing nitrogen and unsaturated functional groups. The fatty or alkyl acid (or ester or anhydride) is saturated to provide better final color and more stability toward thermo-oxidation and degradation. The emulsifier or surfactant is a non-ionic surfactant, preferably an ethoxylated alkyl or fatty acid or alcohol rather than an alkylphenol such as nonylphenol which is thermally less stable, causes yellowing of the final composite part and is of environmental and safety concern. The base is a hydroxylamine that provides good neutralization ability, solubilizes the system and facilitates system emulsification. Such amines are typically chosen to be easily removed from the aqueous system as a water azeotrope thereby providing improved water resistance to the dried systems without causing undesirable color development.

The substantially non-discoloring fiber-size composition of the present invention also includes a hydrophilic coupling agent, typically a silane-based coupling agent. The hydrophilic coupling agent improves the adhesion between the reinforcing fiber material and the polymer matrix resin to be reinforced. The coupling agent is believed to form a "bridge" between the glass fibers and the matrix resin. Reactive functional groups on the coupling agent interact with the surface functional groups on the fibers and also with the film-forming agent of the fiber-size composition. Because the functional groups involved are typically polar in nature, the coupling agent tends to be hydrophilic and readily enters into an aqueous size composition. As such, this coupling agent is referred to here as a "hydrophilic coupling agent." As discussed above, the film-forming component of the fiber-size composition is chosen to be compatible with the matrix resin and eventually enters the matrix resin and may chemically bond with the matrix resin. The hydrophilic coupling agent, which reacts with the glass surface chemical groups, can also react with the matrix resin chemical groups.

A wide variety of hydrophilic coupling agents are known in the art most of which most are silicon-based "silane" coupling agents along with some non-silane entities such as transition-metal complexes of titanium, chromium, or zirconium with amino-containing coupling functionality. Any of these may be used provided they do not contain discoloring functionalities or otherwise weaken the resulting fiber reinforced composite. The typical hydrophilic coupling agent is a silane represented by the formula $X_n$—Si—$Y_{4-n}$, where X is an acid reactive group and Y is a fiber reactive group, and n is preferably 1 but may be 2 or 3. Typically Y is an alkoxy that is hydrolyzed to a hydroxyl group in the fiber-size composition. X is typically an alkyl amino group but other functional groups are commercially available. Aminosilanes are commercially available from OSi Specialties, Inc., located in Tarrytown, N.Y., United States of America, Dow Corning, Inc. located in Midland, Mich., United States of America, or Degussa-Huls AG located in Frankfurt, Germany. A preferred amino silane coupling agent is gamma-aminopropyltriethoxysilane. Examples of silanes having functional groups other than amino functional groups include, but are not limited to: vinyltrimethoxysilane (commercially available as A-171), glycidyloxypropyltrimethoxysilane (commercially available as A-187), and methacryloxypropyltrimethoxysilane (commercially available as A-174), all of which are available from GE Osi Specialties, Inc. The hydrophilic coupling agent is generally included in the fiber-size composition at a concentration of about 0.05% to about 40% by weight on the basis of the total dry solids of the fiber-size composition. Preferably, the hydrophilic coupling agent is used in an amount of from about 0.2% to about 35% by weight total dry solids. Most preferably, the amount is between about 2% to about 30% by weight of the total dry solids in the fiber-size composition.

The present invention features a fiber-size composition with several enhancer components that may be used alone or in combination with each other. These enhancer components include fluorine-containing compounds, hydrophobic coupling agents, cyclic fatty acids, and a combination of at least two saturated fatty acids with one of those fatty acids having at least two acid groups. The enhancer components are believed to promote linkages among the various components of the fiber-reinforced composite or enhance the interface between these components or both. For example, an enhancer can enhance the interaction or bonding of the hydrophilic coupling agent functional groups with the fiber and with the modified polyolefin in the fiber-size composition and in the composite resin when used. An enhancer can enhance the interface between the fiber and polymeric materials by providing a hydrophobic environment that discourages the degrading effects of water and moisture. An enhancer can provide an environment that minimizes color degradation due to oxidation at the coated sizing on the fibers as well as at the interface between the glass fiber and the matrix resin.

The substantially non-discoloring fiber-size composition of the present invention includes a blend of at least two (that is, two or more) saturated fatty acids with one of the fatty acids having at least two fatty acid groups. As used here, the term "fatty acid" includes the lower alkyl acids such as propionic and butyric acid. In one aspect, this blend of fatty acids serves as a nucleating agent, which is believed to affect the size and rate of crystallite (serite) growth in the reinforced composite. The rate of formation and the size of the resulting crystallites have a direct and proportionate effect on the performance of the reinforced composite. Therefore, including an effective amount of the fatty acid blend as a nucleating agent has the effect of optimizing the performance of the composite, especially polyolefin composites.

In another regard, the blend of saturated fatty acids serves as a lubricant in the fiber-size composition. Whereas sizing compositions previously known in the prior art included lubricants such as the cationic lubricant disclosed in WO 048957A1, the fiber-size composition of the present invention eliminates the need for a lubricant as a separate ingredient in addition to the fatty acid blend. In the fiber-size composition of the present invention, the lubricant effect is provided by the fatty acid blend and protects the fibers from breakage and shear stress. Also, it will generally reduce damage to the filaments during fiber production, handling and composite manufacturing ensuring better composite performance. The fatty acid blend also acts as a wetting agent providing better coverage of the fiber filaments by the fiber-size composition during fiber production that protects the fibers and further enhances the performance of the reinforced polyolefin composites. The fatty acid blend acts, to a certain extent, as a mold release agent during the molding operation thereby providing better surface finish to the composite parts and faster molding cycle operations. Because the saturated mono-acid fatty acids are hydrophobic at their alkyl end and hydrophilic at their acid group end, the saturated fatty acids also act as surfactants and eliminate the need for additional surfactants in the fiber-size composition. Finally because the fatty acids of the blend are fully saturated and contain no nitrogen moieties, they are substantially non-discoloring in the final composite product.

A suitable blend of saturated fatty acids for use in the fiber-size composition of the present invention may be selected from two or more $C_3$-$C_{40}$ saturated fatty acids, the salts of these fatty acids, the anhydrides of fatty acids with at least two acids groups, or mixtures thereof. As used here, the term fatty acid includes the lower alkyl carboxylic acids such as propionic and butyric acid. Preferably, the blend of fatty acids comprises a mixture as a solution, dispersion, suspension or emulsion of highly saturated $C_3$-$C_{40}$ fatty acids, anhydrides, or salts thereof, in an aqueous or non-aqueous medium. Most preferably, the blend of fatty acids is provided as an aqueous mixture of two or more $C_3$-$C_{40}$ fatty acids, such as from the mono-acid fatty acids myristic, palmitic, pentadecanoic, margaric, stearic, behenic acid, and montanic acid and from the multi-acid group fatty acids, succinic, adipic, azelaic, pimelic, suberic, sebacic and citric acid. An example of a blend of such fatty acids is a combination of palmitic, sebacic and stearic acids, which, for example, may be obtained commercially as an aqueous emulsion under the trade name "MoldPro 1327" from Witco Polymer Additives, a subsidiary of Crompton Corp., Memphis, Tenn., United States of America. The amount of the blend of fatty acids may range from 0.05% by weight to about 80% by weight, based on the total weight of the dry solids in the fiber-size composition. Preferably, the blend of fatty acids is present in a concentration range from about 0.90% to about 50% by weight. Most preferable is a concentration of 2% to 30% by weight of the dry solids of the fiber-size composition.

A wide variety of fluorine-containing compounds can be incorporated into the fiber-size composition including both fluorides such as calcium fluoride ($CaF_2$) and fluoro complexes such as tetrafluoroborate ($BF_4^-$). Fluorine containing compounds include those of the Group A compounds such as the alkali metals, alkaline-earth metals, and other metallic and non-metallic compounds, and the Group B transition metal compounds. Non-limiting examples of such fluorine containing compounds include sodium fluoride, calcium difluoride, potassium hexafluorozirconate, potassium tetrafluoroaluminate, hexafluorosilicate, ammonium tetrafluoroborate, potassium tetrafluoroborate and sodium tetrafluoroborate. The fluorine-containing compound is generally included in the fiber-size composition at a concentration of about 0.05% to about 15% by weight on the basis of the total dry solids in the fiber-size composition. Preferably, the fluorine-containing compound is used in an amount of from about 0.1% to about 10% by weight total dry solids. Most preferably, the amount is between about 0.3% to about 8% by weight of the total dry solids in the fiber-size composition.

In contrast to the hydrophilic coupling agent where all of the functionality is of a polar character, the hydrophilic coupling agent features at least one substituent that is of a decidedly non-polar (hydrophobic) nature. The typical hydrophobic coupling agent is a silane represented by the formula $R_n$—Si—$Y_{4-n}$, where R is an alkyl group that may be a methyl group, a straight-chain carbon group, or a branched carbon group or an unsaturated carbon group. The value of n may be from one to three, with a value of 1 being preferred. Suitable hydrophobic coupling agents include propyltrimethoxysilane and propyltriethoxysilane. Unsaturated hydrophobic groups are less preferred because of possible discoloration of the resulting composite. Y is a fiber reactive group. Typically Y is an alkoxy group such as a methoxy or ethoxy that is hydrolyzed to a hydroxyl group in the fiber-size composition. The hydrophobic coupling agent is generally included in the fiber-size composition at a concentration of about 1% to about 10% by weight on the basis of the total dry solids in the fiber-size composition. Preferably, the hydrophobic coupling agent is used in an amount from about 2% to about 9% by weight total dry solids. Most preferably, the amount is between about 3% to about 8% by weight of the total dry solids in the fiber-size composition.

The cyclic fatty acids of the present invention are mostly difunctional fatty acid derived dimers. They are produced by the dimerization, e.g., a Diels-Alder-type reaction of long chain unsaturated fatty acid monomers. The monomers may be branched or linear and may be mono or polyunsaturated. Generally the monomeric fatty acids have about 8 carbon atoms in their carbon backbones and may have upwards of 20 or more carbon atoms. Thus when a dimer is formed from two monomers, the dimer will have approximately 16 to 40 or more carbon atoms in the resulting product. The dimer is dibasic and has the unique advantage of being hydrophobic and having a high molecular weight. Any unsaturation of the dimer acid is eliminated by hydrogenation so as to enhance dimer stability. The dimer acid is a six carbon cyclic structure to which two pendant alkyl groups and two pendant alkyl acid groups are attached at separate carbons of the cyclic structure. The dimer acid is a complex mixture of geometric, structural (positional) and conformational isomers. In addition, the dimerization process also produces some trimer acid with an eight carbon cyclic ring, three pendant alkyl acid groups and three pendant alkyl groups. Thus the dimerization of a fatty acid with 18 carbon atoms, e.g., oleic acid, will produce a mixture of 36-carbon atom dibasic acids and some 54-carbon atom tribasic acids. The cyclic fatty acids are commercially available as Pripol 1025 from Uniqema, Wilmington, Del. and Empol 1008 from Cognis Corporation, Cincinnati, Ohio. The cyclic fatty acids are generally included in the fiber-size composition at a concentration of about 1% to about 30% by weight on the basis of the total dry solids in the fiber-size composition. Preferably, the cyclic fatty acids are used in an amount from about 2% to about 20% by weight total dry solids. Most preferably, the amount is between about 4% to about 12% by weight of the total dry solids in the fiber-size composition.

A wide variety of antioxidants may be used including antioxidants based on phosphorous containing compounds, typically those in a lower oxidation state, that is less than plus five, and sulfur compounds typically in an oxidation state of plus four. Lower oxidation state phosphorous and sulfur-containing compounds include bisulfites, sulfites, phosphites, phosphonites, phosphinates, hypophosphites from among the alkali metals, alkaline earth metals, or ammonia. Suitable examples are sodium metabisulfite, sodium sulfite, and sodium hypophosphite, which can be used to improve the stability and color of the emulsion. Typically a hypophosphite such as sodium or potassium hypophosphite is used with sodium hypophosphite being preferred due to its water solubility. The antioxidant is generally included in the fiber-size composition at a concentration of about 0.2% to about 15% by weight on the basis of the total dry solids in the fiber-size composition. Preferably, the antioxidant is used in an amount of from about 0.5% to about 10% by weight total dry solids. Most preferably, the amount is between about 1% to about 8% by weight of the total dry solids in the fiber-size composition.

Boron compounds such as the borohydrides, boronitrides, borazoles, perborates, tetraborates and boric acid may be added to improve initial strength parameters and heat aged color parameters. Typically the boron compounds are used as the sodium salts. The boron compound is generally included in the fiber-size composition at a concentration of about 0.5% to about 15% by weight on the basis of the total dry solids in the fiber-size composition. Preferably, the boron compound is used in an amount of from about 1% to about 10% by weight total dry solids. Most preferably, the amount is between about 2% to about 8% by weight of the total dry solids in the fiber-size composition. The use of boron with fluorine, i.e., as a tetrafluoroborate, is discussed above with regard to the fluorine-containing compounds.

When components are used other than the fatty-acid blend, which alone may serve as a wetting agent, surfactant, and lubricant, it is often necessary to include one or more additives useful to improve fiber wettability, component dispersion, and ease of processing of the fiber-size composition. The wetting agent can be an alkyl sulfosuccinic acid ester based wetting agent such as Rewopol SBDO 75 from Rewo Chemische Werke GmbH, Germany. The dispersant/surfactant/emulsifier is a non-ionic ethoxylated alkyl alcohol such as Lutensol ON60 from BASF, Ludwigshafen, Germany. The lubricant can be a glycerol or glycol based fatty acid ester such as decaglycerol monostearate (Polyaldo 10-1S) ethylene glycol distearate (Glycolube 674), or Glycolube WP2200, all from Lonza, Inc., Fair Lawn, N.J., United States of America. Ionic agents with nitrogen functionality or non-ionic agents based on alkylphenols or ethoxylated nonylphenol compounds are not preferred as they are less stable, can cause yellowing in the fiber-reinforced composite, and in some cases may be environmentally unsound due to their toxicity. The combination of wetting agent, emulsifier, and lubricant is typically in the range from 1-30 wt % of the total dry solids in the fiber-size composition; preferably 2-25 wt %; and most preferred 3-20 wt %. However it is to be realized the amount of these materials will vary greatly depending on the other components in the fiber-size composition. For example and as noted previously, when a mixture of saturated fatty acids is used in the fiber-size composition such components may not even be necessary. Other processing aids, antistats, and other conventionally known additives may also be used.

An antifoaming agent may be added to the fiber-size composition to reduce foam generation during mixing and handling of the fiber-size composition before the fiber-size composition is applied to the reinforcing fiber material. Various types of antifoaming agents may be used-typically those that are silicone based although non-silicone products are available from such vendors as Air Products in Allentown, Pa., United States of America under the trade names Surfynol and Dynol. Examples of suitable antifoaming agents include, but are not limited to, those commercially available from BYK Chemie located in Wesel, Germany under the trade names BYK-011, BYK-018, BYK-020, BYK-021, BYK-022, BYK-023, BYK-024, BYK-025, BYK-028, BYK-031, BYK-032, BYK-033, BYK-034, BYK-035, BYK-036, BYK-037, BYK-045, or BYK-080. BYK-024 is a suitable antifoaming agent for the present invention in that it contains hydrophobic solid polysiloxanes in polyglycol. The antifoaming agent may be added in any amount up to 2% by weight, based on the total weight of the fiber-size composition. Preferably, the antifoaming agent is between about 0.001% and about 0.5% by weight. Most preferable is between about 0.005% and about 0.2% by weight.

The fiber-size composition may be prepared by combining the ingredients thereof according to any method known to one of ordinary skill in the art. Preferably, the fiber-size composition may be made by blending the individual components of the fiber-size composition with a diluent to form a solution or suspension. Most preferably, the diluent is water.

The sequence of combining the ingredients is not critical to forming a stable fiber-size composition. The following is illustrative of a procedure has been found to give a fiber-size composition that can be applied to glass fiber filaments with good results. The emulsion of grafted polyolefin and an aqueous fatty acid blend or a cyclic fatty acid are blended together along with any surfactants, wetting agents and lubricants in water along with aqueous solutions of any water-soluble materials before the addition of the silane coupling agent. The hydrophilic silane coupling agent is preferably added last to minimize the reactions between the ingredients, and primarily to control the viscosity of the fiber-size composition. When a hydrophobic coupling agent such as a hydrophobic silane is used, the hydrophilic silane is hydrolyzed in water in a separate mixture and then the hydrophobic silane is added to the hydrolyzed silane after which this mixture is added to the polyolefin emulsion. Demineralized water is added to the final mixture to bring the composition to the desired dry solids content of the fiber-size composition. The fiber-size composition of the present invention provides a viscosity on the order of from about 5 cPs to about 250 cPs. Changes in viscosity are desirably minimized because differences in viscosity can lead to variations in the thickness of the layer of fiber-size composition that is deposited on the surface of the reinforcing fiber material. An increase or decrease in the thickness of the layer of fiber-size composition can affect the performance of the sized reinforcing fiber material in the composite.

The components, such as the emulsion of grafted polyolefin polymer, the blend of fatty acids, and the coupling agent as well as any of the aforementioned other optional additives are preferably combined in amounts effective to formulate the fiber-size composition as a stable dispersion having a storage stability of up to about 72 hours at temperatures of from about 10° C. to about 32° C. Although pH of the fiber-size composition is not critical, it is preferred that the final fiber-size composition formed by combining all the aforementioned ingredients have a pH in the range of from about 6.5 to about 11.

The fiber-size composition of the present invention may be applied to the reinforcing fiber material by any suitable method to form a coated reinforcing fiber material. The reinforcing fiber material to which the fiber-size composition of the present invention can be applied may be selected from any reinforcing fiber materials known in the art such as glass fibers, polymer fibers, carbon or graphite fibers, natural fibers and any combination thereof. Preferably, glass fibers are used including soda lime glasses, borosilicate glasses such as E-glass, high-strength glasses such as S-glass, and E-type glasses with lower amounts of boron or boron-free glasses. In addition to boron, such glasses may also be free of moieties such as $F_2$, $TiO_2$, and $SO_3$ and their combinations. As used here, the term "boron/fluorine free" refers to glasses with low amounts or none of these two elements. A typical glass fiber used with the present size composition consists essentially of 59.0 to 62.0 weight percent $SiO_2$, 20.0 to 24.0 weight percent CaO, 12.0 to 15.0 weight percent $Al_2O_3$, 1.0 to 4.0 weight percent MgO, 0.0 to 0.5 weight percent $F_2$, 0.1 to 2.0 weight percent $Na_2O$, 0.0 to 0.9 weight percent $TiO_2$, 0.0 to 0.5 weight percent $Fe_2O_3$, 0.0 to 2.0 weight percent $K_2O$, and 0.0 to 0.5 weight percent $SO_3$. More preferably the $SiO_2$ content is about 60.1 weight percent, the CaO content is about 22.1 weight percent, the $Al_2O_3$ content is about 13.2 weight percent, the MgO content is about 3.0 weight percent, the $K_2O$ content is about 0.2 weight percent, the $Na_2O$ content is about 0.6 weight percent, the $Fe_2O_3$ content is about 0.2 weight percent, the combined content of $SO_3$ and $F_2$ content is about 0.1 weight percent, and the $TiO_2$ content is about 0.5 weight percent.

The reinforcing fiber material may be in the form of individual filaments, twisted yarns, strands or rovings. The sized reinforcing fiber material may be used in continuous or discontinuous form in the manufacture of fiber-reinforced composites. The term "continuous" as used herein with regard to the reinforcing fiber material is intended to include reinforcing fiber materials that are in the form of unbroken filaments, threads, strands, yarns or rovings and which may either be sized directly after formation in a continuous fiber-forming operation or which may be formed and wound into packages that can be unwound at a later time to allow application of the fiber-size composition. The term "discontinuous" as used herein with regard to the reinforcing fiber material is intended to include reinforcing fiber materials that have been segmented by chopping or cutting or which are formed from a process designed to form segmented fibers such as a fiber-forming spinner process. The segments of discontinuous reinforcing fiber material that are used in the present invention may vary in length, ranging from about 2 mm to about 25 mm in length.

Accordingly, the fiber-size composition may be applied, for example, to continuous filaments of a reinforcing fiber material immediately after they are formed in an in-line operation, that is, as part of the filament formation process. Alternatively, the fiber-size composition may be applied off-line to unwound strands of reinforcing fiber material that were previously formed and packaged. Also the strands may be cut or chopped in an off-line process. Means for applying the fiber-size composition include, but are not limited to, pads, sprayers, rollers or immersion baths, which allow a substantial amount of the surfaces of the filaments of the reinforcing fiber material to be wetted with the fiber-size composition.

Preferably, the fiber-size composition is applied to a plurality of continuously forming filaments of a reinforcing fiber material as soon as they are formed from a fiber-forming apparatus such as a bushing. The bushing is preferably equipped with small apertures to allow passage of thin streams of a molten reinforcing fiber material. As the streams of molten material emerge from the bushing apertures, each stream is attenuated and pulled downward to form a long, continuous filament. After the filament formation process which includes the application of the fiber-size composition, the continuously forming filaments may then be gathered into strands and chopped or cut in an in-line operation, or they may be gathered into strands for winding into forming packages or doffs after which they may be optionally chopped in an off-line operation. The chopped strands or the forming packages are then dried. Typically, chopped strands are dried in an oven using a temperature ranging from about 50° C. to about 300° C. Typically, forming packages are dried, for example, in a static oven for a period of about 3 hours to about 30 hours at a temperature of about 100-150° C. after which they are ready for use in composite-making operations. Of course, other drying techniques can be used. The glass-fiber composition is typically applied to the fiber in an amount to give about 0.01 to about 6 wt % dry solids, preferably in an amount of 0.03 to about 5 wt % dry solids and most preferably in an amount of about 0.1 to about 4 wt % dry solids based on the total weight of dry solids of the fiber-size composition and the glass fibers.

The resulting sized reinforcing fiber material may be utilized to form a composite material having substantially no discoloration due primarily to the use of the non-discoloring fiber-size composition of the present invention deposited on the fibers. Suitable matrix resins for this purpose may be thermoplastic polymers, thermoset polymers, solution processable polymers, aqueous based polymers, monomers, oligomers, and polymers curable by air, heat, light, x-rays, gamma rays, microwave radiation, dielectric heating, UV radiation, infrared radiation, corona discharge, electron beams, and other similar forms of electromagnetic radiation. Suitable matrix resins include, but are not limited to, polyolefins, modified polyolefins, saturated or unsaturated polyesters, polyacetals, polyamides, polyacrylamides, polyimides, polyethers, polyvinylethers, polystyrenes, polyoxides, polycarbonates, polysiloxanes, polysulfones, polyanhydrides, polyiminesepoxies, polyacrylics, polyvinylesters, polyurethanes, maleic resins, urea resins, melamine resins, phenol resins, furan resins polymer blends, polymer alloys and their mixtures.

Preferably, the matrix resin is a polyolefin. One example of such a polyolefin is a polypropylene homopolymer commercially available as "Moplen HF 1078" from Basell Polypropylene GmbH in Mainz, Germany. The composite formulation may also include one or more conventionally known additives such as coupling agents, compatibilizers, flame retardants, pigments, antioxidants, lubricants, antistats and fillers. A suitable commercially available antioxidant used during the compounding process is the product marketed under the trade name "HP2215" from Ciba Specialty Chemicals Inc., Basel, Switzerland. A coupling agent such as PB 3200 (a maleic anhydride grafted polypropylene) is available from Uniroyal (Crompton), Taft, La., United States of America. Typically the additives are applied in amounts of from 0.1 wt percent to 10 wt percent of the total weight of sized reinforcing fiber and matrix resin, preferably 0.2 wt percent to 7.5 wt percent, and most preferred from 0.25 wt percent to about 5 wt percent.

The process of compounding and molding the sized reinforcing fiber material and the matrix resin to form a composite may be accomplished by any means conventionally known in the art. Such compounding and molding means include, but are not limited to, extrusion, wire coating, compression molding, injection molding, extrusion-compression molding, extrusion-injection-compression molding, long fiber injection, and pushtrusion. In a preferred embodiment of the present invention, when using polyolefin composites, the chopped fiber strand is coated with the fiber-size composition and is extruded with polyolefin resin matrix to form pellets. These chopped pellets then are suitably injection molded into a desired composite article.

The amount of matrix resin included in the composite is generally about 10% to about 99% by weight, based on the total weight of the composite formulation. Preferably, the percent composition of matrix resin is between about 30% and about 95% by weight. Most preferable is about 60% to about 90% by weight, based on the total weight of the composite.

The fiber-size composition of the present invention provides a coating on the reinforcing fibers that improves compatibility and adhesion with the resin matrix, and results in composites with more desirable properties such as higher short-term and long-term mechanical performance, and increased resistance to chemicals, detergents, oxidation, and hydrolysis. Although the mechanism is not fully understood, in composites it is generally observed that the chemicals, detergents, and water that attack the matrix resin and other ingredients present in the composite formulation also attack the glass-matrix inter-phase region that is responsible for the composite performance thus lowering the adhesion and the composite performance.

Where a specific coloration of the final composite product is desired, pigments or other color-enhancing additives may be added to the composite formulation before or during the molding process. Additionally, it may be desired that the composite formulation not contain any inherent discoloration that could affect the desired color of the molded composite product. Therefore, it is desirable that the composite have a clear or neutral coloration. In other applications, it may be preferable that the composite formulation be white, in which case a white pigment may be added. In preparing white composite formulations, it is also desirable that discoloration of the composite be kept to a minimum.

The fiber-size composition disclosed above may suitably comprise, consist of, or consist essentially of an emulsion comprising a modified polyolefin, a hydrophilic coupling agent, at least one of: a) at least two saturated fatty acids of which at least one fatty acid has two acid groups, b) a hydophobic coupling agent, c) a fluorine-containing compound, and d) a cyclic saturated fatty acid, other additives and antifoaming agents.

When the bend of at least two saturated fatty acids with at least one having two acid groups is used, the fiber-size composition may consist of or consist essentially of an emulsion of the modified polyolefin, a hydrophilic coupling agent, an anti-foam agent, inorganic anti-oxidants and fluorine containing compounds, and the two fatty acids where the emulsion of the modified polyolefin consists of or consists essentially of the modified polyolefin, a saturated fatty acid, a non-ionic emulsifier, a base, and water. The base may be limited to a hydroxylamine. Further this composition may be devoid of any or all additional additives in the form of emulsifiers, lubricants, wetting agents, and color enhancing or compensating reagents. The invention illustratively disclosed herein may be practiced in the absence of any element that is not specifically disclosed herein. The following examples are representative, but are in no way limiting as to the scope of this invention.

EXAMPLES

In the following discussion, Part A is directed to examples and testing of fiber-size compositions made with an enhancer having two or more saturated fatty acids in the size composition. Part B is directed to examples and testing of examples made with enhancers that feature fluorine-containing compounds, hydrophobic coupling agents, and cyclic fatty acids.

Part A

Overview:

Fiber-size compositions of the present invention were prepared according to the formulations listed in Table 1. These fiber-size compositions were used to prepare the chopped strands also listed in Table 1. The chopped strands described in Table 1, were extrusion compounded according to the compounding formulations listed in Table 2. Table 2 also refers to the injection molded composite test pieces used for further testing purpose. Each of the prepared composite test pieces was subjected to testing to measure properties like short-term and long-term mechanical properties, long term hydrolysis and detergent aging resistance, and coloring. The results of the various tests are reported in Tables 3 through 6.

Chopped Strand Fiber Examples (A-H, J-L):

Various chopped glass fiber strands were prepared according to sizing formulations of the present invention. Chopped strands A-H and J-L were all produced at different times. The sizing formulation used with chopped strand K contains an optical brightener, whereas the sizing formulation used with chopped strand J does not. Table 1 reports the chopped glass fibers and the sizing formulation used in their production.

TABLE 1

Exemplary size formulations and the chopped glass fiber strands produced from them

| Chopped glass fiber strands | Exemplary Size Formulation Ingredients | | | | Process | Fiber Diameter |
|---|---|---|---|---|---|---|
| | ME 91725 | A-1100 | Moldpro 1327 | BYK-024 | | |
| A, B | 4.01 | 0.92 | 1.01 | 0.009 | Cratec Plus ® | 14µ |
| C, D, E | 4.01 | 0.92 | 1.01 | 0.009 | Cratec ® | 14µ |
| F | 4.01 | 0.92 | 1.01 | 0.009 | Cratec ® | 12µ |
| G, H | 4.01 | 0.93 | 0.98 | 0.017 | Cratec Plus ® | 14µ |
| J, K | Commercial chopped strand products with proprietary size | | | | Cratec Plus ® | 14µ |
| L | | | | | Cratec ® | 14µ |

Remarks:
1) ME 91725: Grafted PP aqueous emulsion from Michelman Inc.
2) A-1100: Amino silane from Osi Specialties
3) Moldpro 1327: Fatty acid dispersion from Witco
4) BYK-024: Antifoam from BYK Chemie
5) Process: Chopped strand production process (like Cratec ® or Cratec Plus ®)
6) Cratec: In-line chopping process
7) Cratec Plus: In-line chopping followed process by bundling process
8) J: Owens Corning 146B-14P chopped glass fiber product that did not include Optical Brightener in its size composition
9) K: Owens Corning 146B-14P commercial chopped glass fiber product that included Optical Brightener in its size composition
10) L: Owens Corning 144A-14C commercial chopped glass fiber product
11) All size formulation ingredients are given as dry parts by weight The order that the ingredients are added to make the size composition may not be critical. However, preferably, 10 liters of each formulation were prepared by first adding an emulsion of polypropylene grafted with maleic anhydride to water (the diluent), then adding the aqueous saturated fatty acid blend. The mixture was blended by stirring for between approximately 5 minutes to 30 minutes, while the temperature of the mixture during stirring was preferably maintained at approximately 25° C. (76.9° F.). After the mixture was thoroughly blended, the amino silane coupling agent was added to the composition, and the water content adjusted to provide a viscosity of preferably about 5 cps to 20 cPs.

The fiber-size composition can be applied to the fibers by any method known in the art, either during their production or at a later stage. Each fiber-size composition was applied to glass fiber strands using a submerged applicator roller process. In this process, the fibers pick up the fiber-size composition during their production by making contact with the surface of a rotating applicator which is submerged in a circulating bath of fiber-size composition. Therefore, the fiber-size composition is applied to the fibers during the continuous fiber production. This type of process is often referred to as an in-line process. The amount of fiber-size composition that is picked up by the fibers from the surface of the rotating applicator can be influenced by several factors such as speed of the applicator roll, concentration of the fiber-size composition, and the amount of water sprayed during the fiber production. In an in-line process, the fiber-size composition can be applied to fibers of different diameters, but the diameter range of 9-27µ, is preferred, and the range of 11-17µ is most preferred. The fiber-size compositions of the present invention were applied to fibers of approximately 12-14µ in diameter as shown in Table 1.

Next in the production process, the fibers are gathered to form a strand that is chopped into strands using an in-line chopping process called the Cratec® process, as named by Owens Corning. During this process, the glass fibers are chopped in-line using a chopper and cot during their manufacturing. The chopped length of the strand may be varied from about 3 mm to 25 mm. The preferred range of the chopped strand length is from 3.5 mm to 13 mm. The most preferred range of the chopped length is from 3.5 mm to 4.5 mm. The most preferred range of the length is also suitable for high shear extrusion processes. The chopped strands are then conveyed over the belt to the drying oven to solidify the fiber-size composition on the glass fibers. Before drying, chopped strands may optionally be sent through the Cratec Plus® process, as named by Owens Corning, to form strand bundles of a size that are suitable for further handling and processing. The Cratec Plus® process is an extension of the Cratec® process in which the glass fibers are chopped in-line using the Cratec® process, then processed in-line in a tumbler to produce strand bundles larger than those obtained with the Cratec® process. The Cratec® and Cratec Plus® processes and related processes are described for example, in U.S. Pat. Nos. 5,578,535, 5,693,378, 5,868,982, and 5,945,134, each is incorporated by reference. In the drying oven, the chopped strands are dried and the fiber-size composition on the fibers is solidified using hot air flow of controlled temperature. The dried fibers are then passed over screens to remove longs, fuzz balls, and other undesirable matter to finally collect the chopped strands in a more desirable form.

Compounding Formulations (Examples 1-14 and Ref 1-3, 2a, 3a):

In Table 2, the compounding formulations are used on chopped strands coated with the sizing formulation of the present invention, and on reference chopped strands.

TABLE 2

Extrusion compounding formulations using chopped fibers coated with exemplary size compositions

| Extrusion compounded pellets | Chopped Strand 30% by wt | PP matrix resin 70% by wt | Coupling Agent 2% by wt | Antioxidant 1% by wt | Pigment 3% by wt |
|---|---|---|---|---|---|
| Examples 1, 2, 3, 4, 5, 6 | A, B, C, D, E, F | KF 6100 | PB 3200 | HP 2225 | |
| Examples 7, 8, 9, 10, 11, 12 | A, B, C, D, E, F | KF 6100 | PB 3200 | HP 2225 | Sachtolith HDS |
| Example 13, 14 | G, H | KF 6100 | PB 3200 | HP 2225 | |
| Ref 1, 2, 3 | J, K, L | KF 6100 | PB 3200 | HP 2225 | |
| Ref 2a, 3a | K, L | KF 6100 | PB 3200 | HP 2225 | Sachtolith HDS |

Remarks:
1) Same nomenclature, as described for the extruded samples in Table 2, is used for the injection molded test samples that are subjected to various testing
2) Coupling agent, antioxidant, pigment % by wt concentrations are based on the total wt of the glass and PP matrix resin (28.3 wt % chopped glass; 1.9 wt % coupling agent; 0.9 wt % antioxidant; 2.8 wt %; 66.0 wt % on a total formulation weight basis).
3) KF 6100: Moplen KF 6100 homopolymer PP matrix resin available form Basell
4) PB 3200: Coupling agent commercially available from Uniroyal
5) HP 2225: Antioxidant HP2225 commercial grade available from Ciba Specialty Chemicals
6) Sachtolith HDS: ZnS pigment commercial grade available from Sachtleben Chemie
7) Examples 1, 2, 3, 4, 5, 6: correspond respectively to A, B, C, D, E, F chopped strands used
8) Examples 7, 8, 9, 10, 11, 12: correspond respectively to A, B, C, D, E, F chopped strands used
9) Examples 13, 14: correspond respectively to G, H chopped strands used
10) Ref 1, 2, 3: correspond respectively to J, K, L chopped strands used
11) Ref 2a, 3a: correspond respectively to K, L chopped strands used In the embodiments of Table 2, 30% (by weight) dried chopped strands are combined with 70% (by weight) polypropylene matrix resin, in a twin-screw extruder of type ZSK 30/2 from Werner & Pfleiderer, to form compounded pellets. During the extrusion compounding, a coupling agent such as Polybond PB 3200 from Uniroyal, may optionally be combined and mixed with the polymer matrix resin to improve the final composite's performance. Such a coupling agent can be mixed during compounding with the resin matrix using 0.1% to 10% coupling agent by weight, based on the total weight of the glass and matrix resin, preferably 0.3% to 5%, and most preferably 0.5% to 3% by weight. Also, during the extrusion compounding, various types of antioxidants such as phenolic, phosphite, or lactone based, may be combined and mixed with the matrix resin for optimum performance of the composite. Such antioxidants may be formulated using 0.1% to 3% antioxidant by weight based on the total weight of the mixture of glass and matrix resin, preferably 0.3% to 2% (by weight), and most preferably 0.5% to 1% (by weight). Antioxidants such as HP 2215 and HP 2225 from Ciba Specialty Chemicals may be used in the compounding formulations because these antioxidants are based on combinations of phenolic, phosphite, and lactone based antioxidants, thereby offering a more balanced effect in controlling the thermal degradation, especially during the processing. Optionally, to pigment the pellets, a color compensating additive such as ZnS (a white pigment available commercially under the trade name "Sachtolith HDS" from Sachtleben Chemie) may be mixed with matrix resin in the range of 0.05% to 10% pigment by weight based on the total weight of the mixture of glass and matrix resin, preferably 0.1% to 5% (by weight), and most preferably 0.5% to 3% (by weight).

Subsequently, the extrusion compounded pellets are fed into any suitable standard molding equipment to form the composite parts. In one embodiment of the present invention, molding is done using a Demag D80 injection molding machine (available from Demag Hamilton Plastics Ltd.) to produce composite test samples which were used to measure composite performance. Thus, each sample of the extrusion compounded pellets of Table 2 was further molded into composite test pieces by standard injection molding. Therefore, all the final injection molded composite pieces refer to the same number and nomenclature as mentioned in Table 2.

Testing:

The resulting composite parts were then tested to measure certain physical characteristics, including tensile strength, izod and charpy impact strength, tensile fatigue, and tensile creep. The parts were also tested to simulate aging by testing the parts for resistance to hydrolysis and detergents. The results of the various tests are reported in Tables 3 through 6.

Short-Term Mechanical Performance and Coloring:

(Examples 1-12, Ref 1-3, Ref 2a 3a):

Test results reported in Table 3 are the measurement of short-term (dry as molded) mechanical performance like tensile strength and impact strength, as well as measurements relating to color for the composite molded pieces according to Examples 1-12, Ref 1-3, and Ref 2a, 3a.

TABLE 3

Short-term (dry as molded) Mechanical performance and Color performance of 30% by wt glass fiber polypropylene composites

| SHORT-TERM MECHANICAL PERFORMANCE | Ref 1 | Ref 2 | Ref 3 | Example 1 | Example 2 | Example 3 | Example 4 | Example 5 | Example 6 |
|---|---|---|---|---|---|---|---|---|---|
| Tensile Strength at break (MPa) | 92.82 | 94.85 | 89.56 | 94.71 | 93.63 | 93.81 | 95.01 | 95.94 | 98.55 |
| Izod unnotched (KJ/m2) | 50.36 | 52.43 | 44.74 | 52.19 | 53.07 | 51.54 | 53.72 | 53.43 | 53.61 |
| Izod notched (KJ/m2) | 12.35 | 13.15 | 12.23 | 12.82 | 12.91 | 12.88 | 12.78 | 12.67 | 12.76 |
| Charpy unnotched (KJ/m2) | — | 44.30 | 35.38 | 45.98 | 44.61 | 45.61 | 44.34 | 39.32 | 45.90 |
| Color | | | | | | | | | |
| L | 75.5 | 74.92 | 75.62 | 70.1 | 71.3 | 72.4 | 74.4 | 74.4 | 74.8 |
| a* | −4.1 | −3.65 | −3.96 | −2.3 | −2.8 | −2.9 | −2.9 | −2.9 | −3 |
| b* | 9.9 | 6.6 | 4.1 | 4.4 | 3.9 | 3.9 | 4.1 | 4.5 | 3.9 |

| SHORT-TERM MECHANICAL PERFORMANCE | Ref 2a | Ref 3a | Example 7 | Example 8 | Example 9 | Example 10 | Example 11 | Example 12 |
|---|---|---|---|---|---|---|---|---|
| Tensile Strength at break (MPa) | 86.99 | 86.68 | 90.98 | 91.87 | 91.43 | 91.67 | 93.54 | 95.17 |
| Izod unnotched (KJ/m2) | 48.24 | 40.78 | 51.01 | 47.90 | 50.73 | 49.43 | 49.96 | 51.90 |
| Izod notched (KJ/m2) | 13.24 | 11.89 | 12.03 | 12.39 | 12.26 | 12.29 | 12.49 | 12.07 |
| Charpy unnotched (KJ/m2) | 41.5 | 34.05 | 43.57 | 44.04 | 40.68 | 40.31 | 42.21 | 43.44 |
| Color | | | | | | | | |
| L | 92.84 | 93.14 | 92.8 | 92.8 | 92.7 | 92.9 | 93.1 | 93.4 |
| a* | −1.91 | −1.9 | −1.4 | −1.7 | −1.7 | −1.7 | −1.7 | −1.8 |
| b* | 4.14 | 2.96 | 3.6 | 3.1 | 3.1 | 3.4 | 3.4 | 3 |

Tensile strength is a measure of resistance when an elongating force is applied, and was measured using a universal testing machine from Zwick, according to ISO method 3268, and the results reported in MPa. Impact testing was carried out using impact testing machine from Zwick. IZOD impact strength, measured in KJ/m$^2$, is a measure of the degree of impact force that the composite can withstand, was measured according to ISO Method 179/1D in un-notched specimens, and according to ISO Method 180 in notched specimens (which were notched 2 mm). Charpy strength is also a measure of impact strength and was measured as resistance in KJ/m$^2$. Charpy strength is measured according to the ISO 179/D method.

The color of the composite samples was quantified using a Minolta CIELab color meter equipped with ChromaControll software. When measuring color, the standard molded pieces in disc shape were used. Color was determined in terms of whiteness (reported as an "L" value), red-green coloration (reported as an "a*" value), and blue-yellow coloration (reported as a "b*" value). A higher "L" value indicates a whiter or lighter coloring of the test piece with higher reflectance. A higher positive "a*" value indicates more red is the test piece, and a higher negative "a*" value indicates more green is the test piece.

Similarly, a higher positive "b*" value indicates more yellow in the test piece, and a higher negative "b*" value indicates more blue in the test piece. In order to achieve whiteness or to match any color, color compensating additives are commonly added. However, such compensating additives lead to complex color formation, making it very difficult, time consuming, and more costly to match the color of the final composite part. For example, to hide or mask the yellow color of a part having high "b*" value, compensating blue color using a bluing agent may be added to shift the "b*" values to a lower value. The bluing agent may also change the original "a*" value resulting in an undesirable coloration. Such color compensating additives are not necessary, but may be used with the present invention.

In the case of non-pigmented extrusion compounding formulations, each of the composites in Examples 1-6 were compared to composite samples Ref 1, Ref 2, and Ref 3. In the case of pigmented extrusion compounding formulation, each of the composite Examples 7-12 was compared to composite samples Ref 2a and Ref 3a. The results of the testing are reported in Table 3.

Long-Term Aging Performance:

Hydrolysis Testing and Detergent Testing (Examples 1-6, 13, 14, and Ref 2, Ref 3):

Tensile strength testing was performed on Examples 1-6, 13, and 14, and Ref 2 and Ref 3 after they had been subjected to hydrolytic and detergent conditions. These conditions were intended to simulate hydrolysis and detergent aging conditions that may be experienced by a laundry or washing machine tub composite part. In such a situation, wet strength and the maximum retention of the properties of the composite over an extended period of time at elevated temperature is desirable. To approximate conditions to test detergent aging resistance, samples of each composite that were molded according to the formulation of Examples 1-6, and Ref 2 and Ref 3, were immersed in a bath containing a 1% detergent solution that was maintained at a temperature of about 95° C. (203° F.) for up to 30 days. The detergent solution was changed every day.

Similarly, for the preparation of samples to measure hydrolysis aging resistance, the samples of each composite, molded according Examples 13 and 14, and Ref 2 and Ref 3, were immersed in water bath that is maintained at a temperature of about 95° C. (203° F.). In both detergent and hydrolysis testing, the samples were removed at intervals of 1, 3, 5, 10, 20, and 30 days, at which time the tensile strength of each sample was measured. The results of detergent aging resistance, testing for tensile strength and impact strength, are recorded in Table 4. The results of the hydrolysis aging resistance, testing for tensile strength and impact strength, are reported in Table 5.

TABLE 4

Long-term Detergent Aging performance of 30% by wt
glass fiber polypropylene composites
DETERGENT AGING PERFORMANCE

|  |  | Ref 2 | | Ref 3 | | Example 1 | | Example 2 | |
|---|---|---|---|---|---|---|---|---|---|
|  | Aging Days | MPa | % Retention | MPa | % Retention | MPa | % Retention | MPa | % Retention |
| Tensile | 0 | 94.85 | 100.00 | 89.56 | 100.00 | 94.71 | 100.00 | 93.63 | 100.00 |
| Strength at | 1 | 92.35 | 97.36 | — | — | 93.30 | 98.51 | 92.42 | 98.70 |
| break and % | 3 | 85.43 | 90.07 | — | — | 89.69 | 94.70 | 89.89 | 96.00 |
| retention | 5 | 83.92 | 88.48 | 86.12 | 96.16 | 87.37 | 92.25 | 89.28 | 95.36 |
| of property | 10 | 80.72 | 85.10 | 82.88 | 92.54 | 84.95 | 89.69 | 85.44 | 91.25 |
| after aging | 30 | 74.70 | 78.76 | — | — | 80.73 | 85.24 | 79.58 | 84.99 |

|  |  | Example 3 | | Example 4 | | Example 5 | | Example 6 | |
|---|---|---|---|---|---|---|---|---|---|
|  | Aging Days | MPa | % Retention | MPa | % Retention | MPa | % Retention | MPa | % Retention |
| Tensile | 0 | 93.81 | 100.00 | 95.01 | 100.00 | 95.94 | 100.00 | 98.55 | 100.00 |
| Strength at | 1 | 92.54 | 98.65 | 93.32 | 98.23 | 93.96 | 97.94 | 96.58 | 98.00 |
| break and % | 3 | 89.02 | 94.90 | 89.36 | 94.05 | 89.41 | 93.19 | 92.44 | 93.79 |
| retention | 5 | 88.14 | 93.96 | 88.07 | 92.69 | 88.22 | 91.95 | 90.66 | 91.99 |
| of property | 10 | 85.21 | 90.83 | 85.29 | 89.77 | 84.46 | 88.03 | 86.32 | 87.59 |
| after aging | 30 | 79.74 | 85.00 | 77.65 | 81.73 | 78.32 | 81.63 | — | — |

|  | Aging Days | KJ/m2 | % Retention |  |  | KJ/m2 | % Retention | KJ/m2 | % Retention |
|---|---|---|---|---|---|---|---|---|---|
| Charpy | 0 | 44.30 | 100.00 | — | — | 45.98 | 100.00 | 44.61 | 100.00 |
| Unnotched | 1 | 37.88 | 85.51 | — | — | 39.72 | 86.40 | 39.30 | 88.10 |
| and % | 3 | 29.29 | 66.12 | — | — | 33.00 | 71.77 | 34.28 | 76.84 |
| retention | 5 | 28.77 | 64.94 | — | — | 30.88 | 67.18 | 32.10 | 71.96 |
| of property | 10 | 24.26 | 54.78 | — | — | 28.67 | 62.37 | 29.19 | 65.44 |
| after aging | 30 | 21.88 | 49.39 | — | — | 28.35 | 61.67 | 25.81 | 57.86 |

|  | Aging Days | KJ/m2 | % Retention | KJ/m2 | % Retention | KJ/m2 | % Retention | KJ/m2 | % Retention |
|---|---|---|---|---|---|---|---|---|---|
| Charpy | 0 | 45.61 | 100.00 | 44.34 | 100.00 | 39.32 | 100.00 | 45.90 | 100.00 |
| Unnotched | 1 | 41.14 | 90.21 | 35.93 | 81.03 | 36.85 | 93.73 | 37.31 | 81.28 |
| and % | 3 | 32.58 | 71.44 | 31.57 | 71.19 | 32.04 | 81.49 | 31.93 | 69.57 |
| retention | 5 | 32.80 | 71.93 | 29.82 | 67.26 | 31.25 | 79.48 | 31.39 | 68.39 |
| of property | 10 | 27.05 | 59.31 | 25.07 | 56.54 | 27.90 | 70.96 | 27.51 | 59.94 |
| after aging | 30 | 25.66 | 56.27 | 24.11 | 54.37 | 23.42 | 59.56 | 23.02 | 50.14 |

TABLE 5

Long-term Hydrolysis Aging performance of 30% by wt
glass fiber polypropylene composites
HYDROLYSIS AGING PERFORMANCE

|  | Aging Days | Ref 2 | | Ref 3 | | Example 13 | | Example 14 | |
|---|---|---|---|---|---|---|---|---|---|
|  |  | MPa | % Retention | MPa | % Retention | MPa | % Retention | MPa | % Retention |
| Tensile Strength | 0 | 92.74 | 100.00 | 91.32 | 100.00 | 96.09 | 100.00 | 95.33 | 100.00 |
| at break and % | 5 | 91.54 | 98.71 | 89.99 | 98.54 | 96.70 | 100.63 | 95.13 | 99.79 |
| retention of | 10 | 90.23 | 97.29 | 88.87 | 97.32 | 94.67 | 98.53 | 93.63 | 98.22 |
| property after aging | 20 | 83.00 | 89.50 | 85.32 | 93.43 | 91.13 | 94.84 | 91.13 | 95.59 |

|  | Aging Days | KJ/m2 | % Retention | KJ/m2 | % Retention | KJ/m2 | % Retention | KJ/m2 | % Retention |
|---|---|---|---|---|---|---|---|---|---|
| Charpy | 0 | 44.44 | 100.00 | 35.13 | 100.00 | 44.13 | 100.00 | 44.61 | 100.00 |
| Unnotched and % | 5 | 35.71 | 80.35 | 26.70 | 76.00 | 36.25 | 82.15 | 37.11 | 83.18 |
| retention of | 10 | 32.23 | 72.52 | 25.88 | 73.66 | 33.79 | 76.58 | 34.01 | 76.23 |
| property after aging | 20 | 28.70 | 64.57 | 23.23 | 66.12 | 32.20 | 72.98 | 32.15 | 72.06 |

Long-term Mechanical Performance:

Tensile Creep and Fatigue (Examples 13, Ref 2, Ref 3):

In order to measure long-term mechanical performance, tensile fatigue and tensile creep testing was performed on Example 13, Ref 2 and Ref 3. The results are reported in Table 6. The results in Table 6 report the absolute values as well as relative % improvement shown by an example of the present invention compared to the Ref 2 and Ref 3 samples. The testing was performed as follows:

Equipment:

Instron 1331 servohydraulic testing machine with clamps in a Thermotron environmental chamber to condition molded specimens at 80° C. (176° F.). Testing controlled by an IBM compatible PC running Instron MAX software.

Method:

Tensile creep is measured by placing a 0.5 inch (1.27 cm) taper molded bar in an Instron 1331 servohydraulic machine, in load control, using a fixed mean level of 120 kg, and an amplitude of zero. The elevated temperature is 80° C. (176° F.). Failure time (hours to creep rupture) were averaged for three specimens.

Fatigue is measured by placing specimen in the Instron servohydraulic machine, in load control, using a sinusoidal wave form. The ratio of minimum to maximum stress on each cycle is 0.05. The test frequency is 6 Hz. Three stress levels were often chosen, 8400, 8900, and 10,000 psi. For the composite pieces of the present invention, a load of 8400 psi (about 57.92 MPa) is used. The cycles to failure were averaged for three specimens.

TABLE 6

Long term Mechanical performance of 30% by wt glass fiber polypropylene composites
LONG-TERM MECHANICAL PERFORMANCE

|  | Ref 2 | Ref 3 | Example 13 | Invention % Improvement over | |
| --- | --- | --- | --- | --- | --- |
|  |  |  |  | Ref 2 | Ref 3 |
| Tensile Fatigue Cycles (×1000) to failure (57.92 MPa) | 2.34 | 1.26 | 3.17 | 35.47 | 151.59 |
| Tensile Creep Failure hours (120 kg, 80° C.) | 3.9 | 0.7 | 5.1 | 30.77 | 628.57 |

Summary of Results:

As seen in Table 3, the composite samples made with the fiber-size composition of the present invention in non-pigmented compounding formulations, show much more desirable short-term (dry as molded) mechanical properties (for example, tensile strength, impact strength) compared to the reference composite samples Ref 1 and Ref 3, although they are similar to Ref 2.

In pigmented compounding formulations, the composite samples made with the fiber-size composition of the present invention show more desirable short-term mechanical properties compared to Ref 2a and Ref 3a. The lowest short-term mechanical performance is measured for Ref 3a, both in pigmented as well as non-pigmented compounding formulations.

In non-pigmented compounding formulations, the composites made with the fiber-size composition of the present invention have lower "a*" and "b*" values indicating more neutral coloring compared to Ref 1, Ref 2, and Ref 3. In pigmented compounding formulations, the composites made with the fiber-size composition of the present invention have better whiteness compared to Ref 2a, but are similar to Ref 3a. Composite samples made with the fiber-size composition of the present invention and 12μ fibers show higher tensile strength than any composites made with 14μ fibers.

As shown in Table 4, composites made using the fiber-size composition of the present invention show better long-term aging and detergent resistance compared to the reference composites. As is seen by the results, the composites made using the fiber-size composition of the present invention have higher absolute values for initial strength and strength after detergent aging of up to 30 days when compared to the references Ref 2 and Ref 3. Also, the composites made using the fiber-size composition of the present invention retain a higher percentage of their initial mechanical strength after aging for up to 30 days when compared to the references Ref 2 and Ref 3. Thus, after 30 days of detergent aging, up to 85% of the initial tensile strength and up to 62% of the initial impact strength (Charpy Unnotched) was retained by the composite made using the fiber-size composition of the present invention. However, only about 79% of the initial tensile strength and about 49% of the initial impact strength was retained by Ref 2 during the same 30 day period.

Similarly, as seen from the results in Table 5, composites made with the fiber-size composition of the present invention show higher absolute values for initial strength and for strength after hydrolysis aging of up to 20 days when compared to the references Ref 2 and Ref 3. Also, composites made with the fiber-size composition of the present invention retain a higher percentage of their initial mechanical strength after hydrolysis aging testing for up to 20 days when compared to the references Ref 2 and Ref 3. Thus, after 20 days of hydrolysis aging testing, up to 96% of the original tensile strength and up to 73% of the original impact strength (Charpy Unnotched) was retained by composites made with the fiber-size composition of the present invention. However, only 90% and 93% of the original tensile strength could be retained by Ref 2 and Ref 3, respectively, and only 65% and 66% of the original impact strength could be retained by Ref 2 and Ref 3 respectively.

The results of long-term mechanical performance for the composites are reported in Table 6. As seen from the results, it is clear that composites made with the fiber-size composition of the present invention provide a large improvement, both in tensile fatigue and tensile creep performance, over both the Ref 2 and the Ref 3. Thus, for tensile fatigue, the % improvement of the long-term mechanical performance for the composite made with the fiber-size composition of the present invention, versus Ref 2 was 35% and versus Ref 3 was 152%. Similarly, for tensile creep, the % improvement of the long-term mechanical performance for the composite made with the fiber-size composition of the present invention versus Ref 2 was 31% and versus Ref 3 was 629%.

Thus the composite parts made using the fibers coated with fiber-size composition of the present invention, offer better short-term mechanical properties, improved long-term mechanical properties, improved detergent and hydrolysis aging resistance, higher retention of initial strength after aging, and better coloring.

Part B

Overview:

The fiber-size compositions of the present invention were prepared according to the formulation listed in Tables 7A and 7B where Table 7B is a continuation of Table 7A. The fiber-size compositions of Tables 7A and 7B were used to prepare chopped strands of E-glass fibers and essentially boron and/or fluorine-free glass fibers which are a type of E-glass. Boron- and/or fluorine free glass fibers are described in U.S. Pat. No. 5,332,699 all of which is incorporated herein by reference as if completely rewritten herein. As set forth in Table 8, the E-glass chopped strands are designed by the letter E while boron/fluorine-free glass chopped strands are designated by the letter A at the end of the fiber-size composition designation from which they are prepared. The chopped strands were then extrusion compounded in pellets according to the compounding formulations given in Table 8. These in turn were injection molded to produce composite test pieces used for further testing. The same designation is used for the sized fibers and the pellets and test pieces into which they are incorporated.

Each of the prepared composite test piece articles was subjected to testing to measure mechanical properties, retention of mechanical properties after hydro-aging, and color parameters before and after heat aging. The results of the tests from the various compositions are reported in Table 9.

Chopped Strand Fiber Examples:

Various chopped glass fiber strands were prepared by applying the sizing formulations set forth in Tables 7A and 7B to E-glass and boron/fluorine-free glass fibers. The sizing formulations are directed to the use of various materials in the sizing formulation that improve the strength and color properties of resulting matrix compositions into which glass fibers coated with the sizing material are incorporated, especially when essentially boron/fluorine-free glass fibers are used in the matrix composition. These materials included: 1) fluorine compounds (formulations S1-S3, S5, S7, S9, S10, and S12), 2) hydrophobic coupling agents (formulations S3-S5, and S8-S13), 3) cyclic fatty acids (formulations S2-S3), 4) antioxidants (formulations S1-S12), 5) boron compounds (formulation S11), and 6) polyurethanes (formulation S12).

TABLE 7A

Exemplary Size Formulations

| Component | C1[1] | S1 | S2 | S3 | S4 | S5 | S6 |
|---|---|---|---|---|---|---|---|
| Modified Polyolefin[2] | 40.71 | 40.6 | 40.59 | 33.66 | 33.66 | 33.66 | 33.66 |
| Polyurethane[3] | | | | | | | |
| Hydrophilic Coupler[4] | 5.7 | 5.69 | 4.55 | 3.2 | 3.3 | 3.3 | 5 |
| Fluorine Enhancer[5] | | 0.55 | 0.55 | 0.55 | | 0.6 | |
| Hydrophobic Coupler[6] | | | | 2 | 2.5 | 2.5 | |
| Cyclic Fatty Acid[7] | | | 2.464 | 2.48 | | | |
| Saturated Fatty Acids[8] | 15.2 | 15.2 | | | | | |
| Boron Compound[9] | | | | | | | |
| Antioxidant[10] | | 1.2 | 1.2 | 1.2 | 1.2 | 1.2 | 1.2 |
| Wetting Agent[11] | | | 1.961 | 1.974 | 1.97 | 1.967 | 1.9736 |
| Lubricant[12] | | | 0.821 | 0.827 | 2.681 | 2.677 | 2.6864 |
| Surfactant[13] | | | 0.924 | 0.93 | 0.928 | 0.927 | 0.93 |
| Antifoam[14] | 0.05 | 0.09 | 0.1 | 0.1 | 0.1 | 0.1 | 0.1 |
| Demineralized Water | 315.8 | 336 | 399.6 | 336.6 | 378.8 | 390.1 | 360.67 |
| Total Vol (5.5% Dry Solids) | 377.5 | 399.3 | 452.8 | 383.5 | | | |
| Total Vol (5.0% Dry Solids) | | | | | 425.1 | 437.0 | 406.2 |

REMARKS:
[1]C1 is a comparative example.
[2]C1-S2: 35% nonionic 1.5 wt % modified polypropylene emulsion. S3-S13: 30% nonionic 1.0 wt % modified polypropylene emulsion.
[3]RSC 396 (40.6%) Polyurethane, Bayer AG, Waldsaal, Germany.
[4]C1-S3, S6-S13: A-1100 gamma-aminopropyltriethoxysilane from GE [Osi] Silicones, Wilton, Connecticut, United States of America. S4-S7: Silquest A-Link 15 Ethylaminosec-butyltriethyloxysilane from GE [Osi] Silicones, Wilton, Connecticut, United States of America. S6-S7: Equal parts by weight of A-110 and Silquest A-Link 15.
[5]Sodium Tetrafluoroborate. Honeywell Specialty Chemicals, Seelze, Germany.
[6]S3: Propyltriethoxysilane; S4, S5, S8-S13: Propyltrimethoxysilane both from Aldrich Chemical, Milwaukee, Wisconsin, United States of America.
[7]Pripol 1025 (100%) from Uniqema, Wilmington Delaware, United States of America or Empol 1008 (100%) from Cognis Corp, Cincinnati, Ohio, United States of America; both are complex mixtures of the cyclic species from the dimerization and trimerization of unsaturated fatty acids with hydrogenation to form fully saturated species.
[8]Moldpro 1327-LA4 (20%); a mixture of saturated fatty acids from Witco Polymer Additives, a subsidiary of Crompton Corp., Memphis, Tennessee, United States of America.

TABLE 7B

Exemplary Size Formulations

| Component | S7 | S8 | S9 | S10 | S11 | S12 | S13 |
|---|---|---|---|---|---|---|---|
| Modified Polyolefin[2] | 33.66 | 33.66 | 33.66 | 33.66 | 33.66 | 33.66 | 33.66 |
| Polyurethane[3] | | | | | | 5 | |
| Hydrophilic Coupler[4] | 5 | 2.5 | 2.5 | 2.5 | 2.5 | 2.5 | 2.5 |
| Fluorine Enhancer[5] | 0.6 | | 0.6 | 0.6 | | 0.46 | |
| Hydrophobic Coupler[6] | | 2.5 | 2.5 | 2.5 | 2.5 | 2.5 | 2.5 |
| Cyclic Fatty Acid[7] | | | | | | | |

TABLE 7B-continued

Exemplary Size Formulations

| Component | S7 | S8 | S9 | S10 | S11 | S12 | S13 |
|---|---|---|---|---|---|---|---|
| Saturated Fatty Acids[8] | | | | | | | |
| Boron Compound[9] | | | | | 0.6 | | |
| Antioxidant[10] | 1.2 | 1.2 | 1.2 | 0.6 | 1.2 | 0.46 | |
| Wetting Agent[11] | 1.9912 | 1.9736 | 1.9736 | 1.9736 | 1.9877 | 1.55 | 1.9806 |
| Lubricant[12] | 2.711 | 2.6865 | 2.6865 | 2.6865 | 2.7058 | | 2.696 |
| Surfactant[13] | 0.938 | 0.93 | 0.93 | 0.93 | 0.9366 | 0.9 | 0.9333 |
| Antifoam[14] | 0.1 | 0.1 | 0.1 | 0.1 | 0.1 | 0.1 | 0.1 |
| Demineralized Water | 373 | 357.74 | 373 | 357.72 | 331.92 | 287.1 | 335.3 |
| Total Vol (5.5% Dry Solids) | | | | | 378.1 | 334.2 | |
| Total Vol (5.0% Dry Solids) | 419.2 | 403.3 | 419.2 | 403.3 | | | 379.7 |

REMARKS:
[9]Disodium tetraborate decahydrate Aldrich Chemical, Milwaukee, Wisconsin, United States of America.
[10]Sodium hypophosphite monohydrate Aldrich Chemical, Milwaukee, Wisconsin, United States of America.
[11]Rewopol SBDO 75 (75%) diisooctylsulfosuccinate from Rewo Chemische Werke GmbH, Germany.
[12]S2-S11, S13: Polyaldo 10-1-S (100%) decaglycerol monosterate; S4-S11, S13 Glycolube 674 (100%) ethylene glycol distearate; both from Lonza Inc., Fair Lawn, New Jersey, United States of America. Weight ratios of Polyaldo 10-1-S: Glycolube 674 in S4-S11 and S13: S4: 1.715:1.072; S5: 1.647:1.03; S6: 1.6532:1.0332; S7: 1.668:1.043; S8-S10: 1.6532:1.0333; S11: 1.6651:1.0407; S13 1.659:1.037.
[13]Lutensol ON60 (100%) Ethoxylated Fatty Alcohol from BASF, Ludwigshafen, Germany.
[14]BYK 024 (17%) a mixture of foam-destroying hydrophobic solid-polysiloxanes in polyglycol from BYK-Chemie, Wesel, Germany.
[15]All size formulation ingredients are given as dry parts by weight The fiber-size compositions of Tables 7A and 7B were formulated by making a first premix of polypropylene dispersed in water. When used, a polyurethane dispersion was added to this premix with agitation. Water-soluble materials such as the fluorine enhancers and antioxidants were dissolved in water and added to the premix with stirring. A second premix of selected components such as the hydrophobic coupling agent and the saturated or cyclic fatty acids along with suitable lubricants, wetting agents, surfactants, and antifoams was made and added to the first premix with stirring. The hydrophilic coupling agent in water was then added. Last, demineralized water was added to attain the desired solids content. The viscosity of the resulting solution was preferably about 5 cPs to about 30 cPs. The temperature of the various mixtures was maintained at a temperature of about 25° C. (76.9° F.) and blending was accomplished in about 5 to 30 minutes.

Each fiber-size composition was applied to glass fiber filaments using a submerged applicator roller process. In this process, the filaments pick up the fiber-size composition during their production by making contact with the surface of a rotating applicator that is submerged in a circulating bath of fiber-size composition. As a result, the fiber-size composition is applied continually to the filaments during fiber production. This type of process is characteristically referred to as an in-line process. The amount of fiber-size composition that is picked up by the filaments from the surface of the rotating applicator can be influenced by several factors such as speed of the applicator roll, concentration of the fiber-size composition, and the amount of water sprayed during the fiber production. The fiber-size compositions of the present invention were applied to fibers of 13 and 14μ in diameter as shown in Table 8.

Next the filaments were gathered to form a strand that was chopped into short lengths using an in-line chopping process. During this process, the glass fibers were chopped in-line using a chopper and cot. The chopped length of the strand was from 3.5 mm to 4.5 mm, which is the preferred range for high shear extrusion processes. The chopped strands were then conveyed on a belt to a drying oven to solidify the fiber-size composition on the glass fibers. In the drying oven, the chopped strands were dried and the fiber-size composition on the fibers was solidified using a hot air flow of controlled temperature. The dried fibers were then passed over screens to remove longs, fuzz balls, and other undesirable matter and collect the chopped strands in a more desirable form.

Compounding Formulations:

In Table 8, the compounding formulations were used on chopped strands of either E-glass or essentially boron/fluorine-free glass coated with the sizing formulations set out in Tables 7A and 7B. The chopped strands are designated with the letter and number of the compounding formulation set out in Tables 7A and 7B with which they are coated. The coating designation ends with either the letter A or E—the letter A designating boron-free fibers and the letter E designating E-glass fibers. All of the boron-free fibers were 13μ in diameter except C1A, which was 14μ. The E-glass fibers for samples C1E and S1-S3E and S9E were 14μ in diameter.

In the embodiments of Table 8, 30 wt % dried chopped strands were combined with 67.8 wt % polypropylene matrix resin (HF 1078) in a twin-screw extruder of type ZSK 30/2 from Werner & Pfleiderer to form compounded pellets. During the extrusion compounding, a coupling agent (1.2 wt %), such as Polybond PB 3200 from Uniroyal (Crompton), was combined and mixed with the polymer matrix resin to improve the final composite's performance. An antioxidant (1.0 wt %), such as HP 2215 from Ciba Specialty Chemicals, was also combined and mixed with the matrix resin. All ingredients in the formulation total 100 wt %, that is, weight percents are based on the total dry weight of the formulation.

Subsequently, the extrusion-compounded pellets were molded to form the sized glass-fiber reinforced composite articles using an Arburg 420C (Class All Rounder 800-250) injection molding machine (available from Arburg GmbH and Company, Lossburg, Germany). All the final injection molded composite articles use the same sample identification nomenclature as given in Table 8 and used with the sized glass-fibers.

TABLE 8

Extrusion Compounding Formulations using Chopped Fibers with Exemplary Size Compositions

| Extrusion Compounded Pellets | Chopped Strand Glass Fiber Type 30% by weight | Glass Fiber Diameter microns | Polypropylene Matrix Resin 67.8% by weight | Coupling Agent 1.2% by weight | Antioxidant 1.0% by weight |
|---|---|---|---|---|---|
| C1E, C1A, S1E-S3E, S9E | E-Glass | 14 | HF1078 | PB 3200 | HP 2215 |
| C1A | Boron-free | 14 | HF1078 | PB 3200 | HP 2215 |
| S1A-S13A | Boron-free | 13 | HF1078 | PB 3200 | HP 2215 |

REMARKS:
1) The initial letter and number refer to the size composition applied to the fiber while the final letter refers to the type of glass fiber used—E being used for E-Glass and A being used for boron/fluorine-free glass; the nomenclature used for the sized fiber is also used for the extrusion compounded pellets and the injection molded test samples used for testing.
2) The size composition is applied to the glass fibers using the Cratec Plus ® process.
3) HF 1078; Moplen HF 1078 homopolymer polypropylene matrix resin available from Basell
4) PB 3200: Coupling agent commercially available from Uniroyal (Crompton).
5) HP2215: Antioxidant HP2215 commercial grade available from Ciba Specialty Chemicals.

Testing:

The composite parts were tested to measure certain physical characteristics including tensile strength and Charpy unnotched impact strength. The parts were also tested to simulate aging by testing the parts for resistance to hydrolysis and heat. The composite parts were also tested with regard to color dry as made (DAM) and after heat aging. The results of the various tests are reported in Table 9.

Tensile strength is a measure of resistance when an elongating force is applied and was measured using a universal testing machine from Zwick, according to ISO method 3268, and the results reported in MPa. Charpy strength is a measure of impact strength and was measured as resistance in KJ/m². Charpy strength was measured according to the ISO 179/D method.

The color of the composite samples was quantified using a Minolta CIELab color meter equipped with ChromaControll software. When measuring color, the standard molded pieces in disc or plaque shape were used. Color was determined in terms of blue-yellow coloration (reported as a "b*" value) and a yellow index (reported as a "YI" value). A higher positive "b*" value indicates more yellow in the test piece, and a higher negative "b*" value indicates more blue in the test piece. A higher "YI" value indicates more yellow in the test piece. The change in b* and YI were determined after heat aging and are reported as Δb* and ΔYI values.

To measure hydrolysis aging resistance, samples of each composite were immersed in a water bath that was maintained at a temperature of about 95° C. (203° F.). The samples were removed after 20 days at which time the tensile strength was measured. Heat aging was carried out by placing the samples in an oven at 150° C. (302° F.) for twenty-four hours.

TABLE 9

Composite Article Test Results

| Fiber Product | Tensile DAM (MPa) | Tensile Hydro Aged (MPa) | Tensile Retention (%) | ChUnn DAM (kJ/m2) | ChUnn Hydro Aged (kJ/m2) | Color DAM b* | Color DAM YI | Color Heat Aged Δb | Color Heat Aged ΔYI |
|---|---|---|---|---|---|---|---|---|---|
| C1A | 86.5 | 72.69 | 84.03 | 51.97 | 30.61 | 8.16 | 21.8 | 1.22 | 1.29 |
| C1E | 87.31 | 79.33 | 90.86 | 45.03 | 32.95 | 5.35 | 14.19 | 3.18 | 8.21 |
| S1A | 91.9 | 81.41 | 88.59 | 50.79 | 31.82 | 2.44 | 3.83 | 0.36 | 0.15 |
| S1E | 85.33 | 79.39 | 93.04 | 48.11 | 35.37 | 3.05 | 5.98 | 0.57 | 0.49 |
| S2A | 92.47 | 79.99 | 86.50 | 53.11 | 26.66 | 2.55 | 4.72 | 1.88 | 2.65 |
| S2E | 86.42 | 78.09 | 90.36 | 48.72 | 30.24 | 2.81 | 5.75 | 1.71 | 2.28 |
| S3A | 90.9 | 79.78 | 87.77 | 51.2 | 27.82 | 2.99 | 6 | 3.43 | 6.12 |
| S3E | 84.84 | 76.71 | 90.42 | 48.11 | 28.35 | 3 | 6.27 | 2.23 | 3.68 |
| S4A | 92.22 | 70.98 | 76.97 | 44.6 | 16.88 | 3.04 | 5.17 | 2.34 | 5.6 |
| S5A | 93.32 | 76.19 | 81.64 | 46.35 | 20.54 | 2.33 | 3.18 | 1.76 | 3.82 |
| S6A | 95.41 | 73.9 | 77.46 | 44.99 | 19.68 | 3.3 | 6.26 | 3.56 | 8.35 |
| S7A | 95.71 | 75.6 | 78.99 | 48.74 | 19.95 | 2.94 | 5.16 | 2.2 | 5.05 |
| S8A | 93.01 | 72.51 | 77.96 | 49.61 | 20.93 | 3.35 | 7.15 | 2.33 | 4.57 |
| S9A | 92.12 | 79.43 | 86.22 | 48.34 | 24.57 | 2.77 | 5.37 | 1.02 | 1.37 |
| S9E | 86.88 | 78.41 | 90.25 | 48.42 | 27.05 | 3.41 | 7.05 | 1.18 | 1.81 |
| S10A | 94.16 | 77.13 | 81.91 | 47.31 | 19.67 | 3.06 | 5.82 | 0.86 | 1.09 |
| S11A | 93.32 | 70.36 | 75.40 | 46.42 | 17.51 | 1.96 | 3.19 | 3.17 | 7.48 |

TABLE 9-continued

Composite Article Test Results

| Fiber Product | Tensile DAM (MPa) | Tensile Hydro Aged (MPa) | Tensile Retention (%) | ChUnn DAM (kJ/m2) | ChUnn Hydro Aged (kJ/m2) | Color DAM b* | Color DAM YI | Color Heat Aged Δb | Color Heat Aged ΔYI |
|---|---|---|---|---|---|---|---|---|---|
| S12A | 91.84 | 75.85 | 82.59 | 42.57 | 18.57 | 3.1 | 6.1 | 2.76 | 5.7 |
| S13A | 92.55 | 67.81 | 73.28 | 44.81 | 17.94 | 3.76 | 6.83 | 1.93 | 4.78 |

REMARKS:
1 The initial letter and number designate the sizing composition used as described in Table A. The final letter designates the type of glass fiber used. A is an essentially boron/fluorine free-type glass; E is an E-type glass.
2 Hydro aging was carried out for 20 days in a water bath maintained at 95° C. (203° F.).
3 DAM = Dry as made samples.
4 Heat aging was carried out for twenty-four hours at 150° C. (302° F.).

Summary of Results:

To gauge the impact of an added fluorine-containing compound in the fiber glass sizing composition on the properties of the resulting sized, glass-fiber reinforced composite various sets of samples were compared, i.e., S4A vs S5A, S6A vs S7A, S8A vs S9A and S11A vs S9A. In each pair, the first fiber-size composition was devoid of fluoride-containing compounds while the second composition contained a fluorine compound. As seen in looking at the test results for the above pairs in Table 9, the addition of a fluorine compound to the fiber-size composition improved a majority of initial strength properties and all hydro-aged strength parameters as well as all of the percent retention observations. A fluorine additive also improved all initial and heat-aged color change properties. When comparing the S9E (E-glass) composite sample with the S9A (boron/fluorine-free glass) composite sample, all color parameters, both initial and heat-aged, were better for the boron/fluorine free glass along with initial and hydro-aged tensile strength.

The effect of the addition of a hydrophobic coupling agent to the glass size composition can be seen by examining the following sets of samples: S7A vs S5A, S6A vs S4A, S7A vs S9A. In each pair, the first composite was lacking in a hydrophobic coupling agent while the second composite contained such a component. The E-glass reinforced composite (S9E) and the boron/fluorine-free glass reinforced composite (S9A), which both contain the hydrophobic coupling agent, were also compared. Looking at the results, one sees that the addition of a hydrophobic coupling agent offers improved hydro-aged tensile strength parameters for many of the strength parameters and most of the color parameters, both initial and with heat-age change.

The effect of a cyclic fatty acid on the properties of a glass-fiber reinforced composite are evident by comparing S5A with S3A, the former having no fatty acid while the latter contains a cyclic fatty acid. The strength and color differences between a cyclic fatty acid and a saturated fatty acid can be seen by comparing S1A vs S2A and S1E vs S2E, the initial composite of each set containing the saturated fatty acid with the latter containing the cyclic fatty acid. Finally the boron/fluorine-free glass composite was compared with the E-glass reinforced composite by looking at S3E vs S3A. The cyclic fatty acids show improvement for all of the initial unnotched Charpy tests and several of the initial tensile, tensile hydro-aged, percent retention and Charpy hydro-aged tests and initial color tests.

The impact of an antioxidant on the various strength and color parameters of a composite reinforced with a sized fiber glass of the present invention can be seen by looking at the test results for S13A vs S4A and S13A vs S8A. Here, except for initial b* and ΔYI, the antioxidant provides improvements for the other properties, especially the tensile strength hydro-aged and retention values. As seen in a comparison of comparative sample C1A and C1E with samples S1A and S1E, respectively, a combination of tetrafluoroborate and antioxidant additives results in better performance for both boron/fluorine-free glasses and E glasses in initial and hydro-aged tests. Preliminary tensile creep and tensile fatigue tests under both initial and hydro-aging conditions have shown increases of more than one hundred percent for these parameters for most of the samples tested.

The effect of boron can be seen by examining S4A vs S11A and S8A vs S11A. Here composite samples S4A and S8A have no boron while composite sample S11A uses a boron compound. Boron produced better initial test values for all tests.

The impact of a polyurethane film former on the size composition (in addition to the modified polypropylene) can be seen by comparing the test results for composite S10A (lacking polyurethane) with S12A (containing polyurethane). As evident, polyurethane gives better strength retention with hydro-aging. It was also noted that fiber strands with this additive generally had better processing qualities during emulsion formation and application and gave fiber integrity during initial fiber formation and subsequent fiber-resin matrix processing. As seen in comparing S12A with S13A, the polyurethane does not appreciably affect the properties as compared to a sample without fluorides and an antioxidant.

Generally it has been shown that various size composition additives such as fluorine-containing compounds, hydrophobic coupling agents, cyclic fatty acid, antioxidants, boron-containing compounds and polyurethane improve the strength, color parameters and processing parameters of E-glass including boron/fluorine-free glass fibers as used in the strengthening of composite article formulations.

We claim:

1. A fiber-size composition comprising:
a) a modified polyolefin;
b) a hydrophilic coupling agent;
c) two or more enhancers selected from the group consisting of
1) a fluorine-containing compound selected from fluoroborates, alkali-metal fluorides, fluoroaluminates, fluorozirconates and mixtures thereof;
2) a hydrophobic coupling agent; and
3) a cyclic fatty acid;

wherein other components of said fiber-size composition are essentially fully saturated and are substantially free of discoloring nitrogen-containing compounds.

2. The fiber-size composition according to claim 1 wherein said fiber-size composition is aqueous based.

3. The fiber-size composition according to claim 1 wherein said modified polyolefin is formed as a nonionic aqueous polymer emulsion from a single, pressurized, heated and stirred mixture comprising said modified polyolefin, a fatty acid, a nonionic surfactant, a base, and water.

4. The fiber-size composition of claim 1 with said modified polyolefin being a maleic anhydride modified polypropylene with a molecular weight greater than about 80,000.

5. The fiber-size composition of claim 1 wherein said hydrophilic coupling agent is a hydrophilic silane coupling agent.

6. The fiber-size composition according to claim 1 wherein said fluorine-containing compound is a tetrafluoroborate.

7. The fiber-size composition according to claim 6 wherein said tetrafluoroborate is selected from the group consisting of alkali metal tetrafluoroborates, alkaline earth tetrafluoroborates, ammonium tetrafluroborate, and mixtures thereof.

8. The fiber-size composition according to claim 7 wherein said tetrafluoroborate is selected from the alkali metal tetrafluoroborates consisting of sodium tetrafluoroborate, potassium tetrafluoroborate, and mixtures thereof.

9. The fiber-size composition according to claim 7 wherein said alkali metal tetrafluoroborate is selected as sodium tetrafluoroborate.

10. The fiber-size composition according to claim 1 wherein said hydrophobic coupling agent is a hydrophobic silane comprising from one to three hydrophobic groups.

11. The fiber-size composition according to claim 10 wherein said hydrophobic group is an alkyl group.

12. The fiber-size composition according to claim 1 wherein said hydrophobic coupling agent is selected from the group consisting of propyltrimethoxysilane, propyltriethoxysilane, and mixtures thereof.

13. The fiber-size composition according to claim 1 wherein said cyclic fatty acid comprises saturated dimer and trimer cylic fatty acids formed from unsaturated fatty acid monomers having carbon backbones with from about eight to about forty carbon atoms.

14. The fiber-size composition according to claim 13 wherein said cyclic fatty acid is formed from an unsaturated fatty acid monomer with a carbon backbone having eighteen carbon atoms.

15. The fiber-size composition according to claim 1 wherein said cyclic fatty acid comprises a hydrogenated dimer formed from oleic acid.

16. The fiber-size composition according to claim 1 wherein said fiber-size composition is used without color compensating additives.

17. The fiber-size composition according to claim 1 further comprising at least one of the following processing aids selected from the group consisting of wetting agents, lubricants, surfactants, and antifoam agents exclusive of ionic agents with nitrogen functionality, unsaturated functionality, and non-ionic agents based on alkylphenols.

18. The fiber-size composition of claim 1 further comprising a boron-containing compound.

19. The fiber-size composition of claim 18 wherein said boron-containing compound is selected from the group of compounds consisting of borohydrides, boron halides, boron nitride, organoboron compounds, borazoles, perborates, borosilicates, tetraborates, boric acid and mixtures thereof.

20. The fiber-size composition of claim 18 wherein said boron-containing compound is selected from the group of tetraborates consisting of alkali metal tetraborates, alkaline earth tetraborates, ammonium borate, and mixtures thereof.

21. The fiber-size composition of claim 20 wherein said tetraborate is selected from the group of tetraborates consisting of disodium tetraborate, dipotassium tetraborate, diammonium tetraborate, and mixtures thereof.

22. The fiber-size composition of claim 21 wherein said selected tetraborate is disodium tetraborate.

23. The fiber-size composition of claim 1, further comprising an additive selected from P(III) compounds, S(IV) compounds and mixtures thereof.

24. The fiber-size composition of claim 23 wherein said P(III) compound is a hypophosphite compound.

25. The fiber-size composition of claim 24 wherein said hypophosphite compound is selected from the group consisting of alkali metal hypophosphites, alkaline-earth hypophosphites, ammonium hypophosphite and mixtures thereof.

26. The fiber-size composition of claim 25 wherein said selected hypophosphite compound is sodium hypophosphite.

27. A reinforcing fiber coated with the fiber-size composition of claim 1.

28. The reinforcing fiber of claim 27 wherein said fiber is an E-glass fiber.

29. The reinforcing fiber of claim 27 wherein said fiber is a boron-free glass fiber.

30. The reinforcing fiber of claim 29 with said boron-free glass fiber consisting essentially of 59.0 to 62.0 weight percent $SiO_2$, 20.0 to 24.0 weight percent CaO, 12.0 to 15.0 weight percent $Al_2O_3$, 1.0 to 4.0 weight percent MgO, 0.0 to 0.5 weight percent $F_2$, 0.1 to 2.0 weight percent $Na_2O$, 0.0 to 0.9 weight percent $TiO_2$, 0.0 to 0,5 weight percent $Fe_2O_3$, 0.0 to 2.0 weight percent $K_2O$, and 0.0 to 0.5 weight percent $SO_3$.

31. The reinforcing fiber of claim 30 wherein in said boron-free glass fiber the $SiO_2$ content is about 60.1 weight percent, the CaO content is about 22.1 weight percent the $Al_2O_3$ content is about 13.2 weight percent, the MgO content is about 3.0 weight percent the $K_2O$ content is about 0.2 weight percent, the $Na_2O$ content is about 0.6 weight percent, the $Fe_2O_3$ content is about 0.2 weight percent, the combined content of $SO_3$ and $F_2$ content is about 0.1 weight percent, and the $TiO_2$ content is about 0.5 weight percent.

32. The reinforcing fiber of claim 29 wherein said glass fiber is essentially free of a moiety from the group of moieties consisting of $F_2$, $TiO_2$, $SO_3$, and combinations thereof.

33. A compounding formulation comprising the reinforcing fiber of claim 27 and a matrix resin.

34. The compounding formulation of claim 33 further comprising at least one compounding agent selected from the group consisting of coupling agents, antioxidants, pigments, antistats, fillers, and flame retardants.

35. The compounding formulation of claim 33 wherein said matrix resin is selected from the group consisting of polyolefins, polyesters, polyacetals, polyamides, polyacrylamides, polyimides, polyethers, polyvinylethers, polystyrenes, polyoxides, polycarbonates, polysiloxanes, polysulfones, polyanhydrides, polyimines, epoxies, polyacrylics, polyvinylesters, polyurethane, maleic resins, urea resins, melamine resins, phenol resins, furan resins, polymer blends, polymer alloys, and mixtures thereof.

36. The compounding formulation of claim 35 wherein said matrix resin is a polyolefin.

37. The compounding formulation of claim 36 wherein said polyolefin is polypropylene.

38. The compounding formulation of claim 37 further comprising a modified polyolefin.

39. The compounding formulation of claim 38 further comprising an antioxidant.

40. A composite pellet formed from the compounding formulation of claim 33.

41. A composite article formed from the compounding formulation of claim 33.

42. A method of preparing reinforcing fibers comprising:
   a) preparing a fiber-size composition comprising:
      1) a modified polyolefin,
      2) a hydrophilic coupling agent,
      3) two or more enhancers selected from the group consisting of:
         (a) a fluorine-containing compound selected from fluoroborates, alkali-metal fluorides, fluoroaluminates, fluorozirconates and mixtures thereof;
         (b) a hydrophobic coupling agent; and
         (c) a cyclic fatty acid; and
   b) contacting fibers with said fiber-size composition; and
   c) allowing said fiber-size composition to solidify on said fibers to form said reinforcing fibers,
      wherein other components of said fiber-size composition are essentially fully saturated and are substantially free of discoloring nitrogen-containing compounds.

43. The method of preparing reinforcing fibers according to claim 42 wherein said modified polyolefin is prepared as a nonionic aqueous polyolefin emulsion by heating and stirring a single mixture of said modified polyolefin, a fatty acid, a nonionic surfactant, a base, and water in a pressurized container.

44. The method of preparing reinforcing fibers according to claim 42 wherein said fibers are glass fibers.

45. The method of preparing reinforcing fibers according to claim 44 wherein said glass fibers are essentially boron-free glass fibers.

46. The method of claim 42 wherein said fiber-size composition is used without color compensating additives.

47. A method of preparing a composite formulation comprising the step of combining said reinforcing fibers prepared according to the method of claim 42 with a matrix resin to form said composite formulation.

48. The method of preparing a composite formulation according to claim 47 further comprising the step of combining said reinforcing fibers and said matrix resin with one of the group consisting of coupling agents, antioxidants, pigments, antistats, fillers, flame retardants, and mixtures thereof.

49. A method of preparing a composite article comprising the step of forming said composite formulation formed in claim 48 into said composite article.

50. The fiber-size composition of claim 42, further comprising an additive selected from P(III) compounds, S(IV) compounds and mixtures thereof.

51. A fiber-size composition comprising:
   a) a modified polyolefin;
   b) a hydrophilic coupling agent;
   c) two or more enhancers selected from the group consisting of:
      1) a fluorine-containing compound selected from the group consisting of fluoroborates, alkali-metal fluorides, fluoroaluminates, fluorozirconates and mixtures thereof;
      2) a hydrophobic coupling agent; and
      3) a cyclic fatty acid; and
   d) a polyurethane.

52. The fiber-size composition of claim 51 further comprising a boron-containing compound.

53. The fiber-size composition of claim 51, wherein said boron-containing compound is selected from the group consisting of borohydrides, boron halides, boron nitride, organoboron compounds, borazoles, perborates, borosilicates, tetraborates, boric acid and mixtures thereof.

54. The fiber-size composition of claim 53 wherein said boron-containing compound is selected from the group consisting of alkali metal tetraborates, alkaline earth tetraborates, ammonium borate and mixtures thereof.

55. The fiber-size composition of claim 54 wherein said tetraborate is selected from the group consisting of disodium, tetraborate, dipotassium tetraborate, diammonium tetraborate and mixtures thereof.

56. The fiber-size composition of claim 55 wherein said tetraborate is disodium tetraborate.

57. The fiber-size composition of claim 51, further comprising an additive selected from P(III) compounds, S(IV) compounds and mixtures thereof.

\* \* \* \* \*